(12) United States Patent
Satou

(10) Patent No.: US 11,454,442 B2
(45) Date of Patent: Sep. 27, 2022

(54) ABNORMALITY DETERMINATION DEVICE FOR TRANSPORTING FREEZING DEVICE, TRANSPORTING FREEZING DEVICE INCLUDING THIS ABNORMALITY DETERMINATION DEVICE, AND ABNORMALITY DETERMINATION METHOD FOR TRANSPORTING FREEZING DEVICE

(71) Applicant: DAIKIN INDUSTRIES, LTD., Osaka (JP)

(72) Inventor: Kiichirou Satou, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/278,920

(22) PCT Filed: Sep. 26, 2019

(86) PCT No.: PCT/JP2019/037875
§ 371 (c)(1),
(2) Date: Mar. 23, 2021

(87) PCT Pub. No.: WO2020/067297
PCT Pub. Date: Apr. 2, 2020

(65) Prior Publication Data
US 2021/0310727 A1    Oct. 7, 2021

(30) Foreign Application Priority Data
Sep. 28, 2018  (JP) .............................. JP2018-184239

(51) Int. Cl.
*F25D 29/00*     (2006.01)
*G05B 23/02*     (2006.01)

(52) U.S. Cl.
CPC ....... *F25D 29/003* (2013.01); *G05B 23/0283* (2013.01); *F25D 2500/04* (2013.01); *G05B 23/0221* (2013.01)

(58) Field of Classification Search
None
See application file for complete search history.

(56) References Cited

U.S. PATENT DOCUMENTS 6,233,952 B1 * 5/2001 Porter ................... F25D 29/003
62/131
9,097,456 B2    8/2015 Thagersen et al.
(Continued)

FOREIGN PATENT DOCUMENTS

EP    2 597 405 A1    5/2013
GB    2587278 A   *  3/2021 .............. F25B 41/24
(Continued)

OTHER PUBLICATIONS

English translation of the Internation Preliminary Report on Patentability and Written Opinion of the International Searching Authority, for International Application No. PCT/JP2019/037875 dated Mar. 23, 2021.
(Continued)

*Primary Examiner* — Arleen M Vazquez
*Assistant Examiner* — Terence E Stifter, Jr.
(74) *Attorney, Agent, or Firm* — Birch, Stewart, Kolasch & Birch, LLP

(57) ABSTRACT

An abnormality determination device for a transporting refrigeration apparatus includes a determination unit that determines an abnormality of the transporting refrigeration apparatus installed on a container. In pre-trip inspection that is conducted before the container is loaded on a transporting device, a test operation is performed for test operating modes. The pre-trip inspection is conducted multiple times.
(Continued)

The abnormality determination device is configured to obtain at least part of time series test data related to a same one of the test operating modes in the pre-trip inspection. The determination unit is configured to determine whether the transporting refrigeration apparatus has an abnormality based on a change trend of the time series test data related to a same one of the test operating modes when the pre-trip inspection is conducted multiple times, and when there is no abnormality, estimate an abnormality occurrence time.

11 Claims, 15 Drawing Sheets

(56) References Cited

U.S. PATENT DOCUMENTS

| | | | |
|---|---|---|---|
| 2016/0131605 A1* | 5/2016 | Hamrouni | B60H 1/00014 702/183 |
| 2016/0216028 A1* | 7/2016 | Jonsson | F25D 29/003 |
| 2017/0268811 A1* | 9/2017 | Ochiai | F24F 11/38 |
| 2017/0356778 A1* | 12/2017 | Thogersen | F25B 49/005 |
| 2018/0128713 A1* | 5/2018 | Kriss | F24F 11/38 |
| 2019/0072320 A1* | 3/2019 | Devi | F25D 29/008 |

FOREIGN PATENT DOCUMENTS

| | | |
|---|---|---|
| JP | 11-161318 A | 6/1999 |
| JP | 2005-241089 A | 9/2005 |
| JP | 2008-249234 A | 10/2008 |
| JP | 2010-127568 A | 6/2010 |
| JP | 2014-214970 A | 11/2014 |

OTHER PUBLICATIONS

Internation Search Report for International Application No. PCT/JP2019/037875 with English translation, dated Nov. 26, 2019.

Extended European Search Report for EP Application No. 19861455, dated Oct. 5, 2021.

* cited by examiner

ABNORMALITY DETERMINATION DEVICE FOR TRANSPORTING FREEZING DEVICE, TRANSPORTING FREEZING DEVICE INCLUDING THIS ABNORMALITY DETERMINATION DEVICE, AND ABNORMALITY DETERMINATION METHOD FOR TRANSPORTING FREEZING DEVICE

TECHNICAL FIELD

The present disclosure relates to an abnormality determination device for a transporting refrigeration apparatus, a transporting refrigeration apparatus including the abnormality determination device, and a method for determining an abnormality of a transporting refrigeration apparatus.

BACKGROUND ART

When a transporting refrigeration apparatus is installed on a container, which is, for example, a shipping container, pre-trip inspection (PTI) is conducted on the transporting refrigeration apparatus before the container is transported. In the pre-trip inspection of the transporting refrigeration apparatus, whether the transporting refrigeration apparatus is normal is determined based on, for example, whether a value that changes when a compressor, a fan, an actuator, and other components of the transporting refrigeration apparatus are actuated is in a predetermined range. In addition, for example, in Patent Document 1, whether the transporting refrigeration apparatus is normal is determined in a predetermined period during transportation of the container.

PRIOR ART DOCUMENT

Patent Document

Patent Document 1: U.S. Pat. No. 9,097,456

SUMMARY OF THE INVENTION

Problems that the Invention is to Solve

The cargo in a container and a set temperature of a transporting refrigeration apparatus differ in accordance with items subject to transportation. Hence, the transporting refrigeration apparatus may not be constantly operated under the same condition during transportation of the container. During transportation of the container, different operation conditions of the transporting refrigeration apparatus may cause an inaccurate abnormality determination of the transporting refrigeration apparatus.

It is an object of the present disclosure to provide an abnormality determination device for a transporting refrigeration apparatus, a transporting refrigeration apparatus including the abnormality determination device, and a method for determining an abnormality of a transporting refrigeration apparatus that accurately determine an abnormality of the transporting refrigeration apparatus.

Means for Solving the Problems

The present disclosure related to an abnormality determination device for a transporting refrigeration apparatus. The abnormality determination device includes a determination unit that determines an abnormality of the transporting refrigeration apparatus installed on a container. The transporting refrigeration apparatus includes a refrigerant circuit that connects a compressor, a condenser, a decompression device, and an evaporator. In pre-trip inspection that is conducted before the container is loaded on a transporting device, the abnormality determination device performs a test operation for test operating modes. The pre-trip inspection is conducted multiple times. The abnormality determination device is configured to obtain at least part of time series test data related to a same one of the test operating modes in the pre-trip inspection. The determination unit is configured to determine whether the transporting refrigeration apparatus has an abnormality based on a change trend of the time series test data related to a same one of the test operating modes when the pre-trip inspection is conducted multiple times. When there is no abnormality, the determination unit is configured to estimate an abnormality occurrence time.

This configuration uses time series test data of a test operating mode obtained in the pre-trip inspection, so that whether the transporting refrigeration apparatus has an abnormality is determined while limiting variations in the operation state of the transporting refrigeration apparatus. When there is no abnormality, an abnormality occurrence time is estimated. The abnormality determination of the transporting refrigeration apparatus and the estimation of an abnormality occurrence time are accurately performed.

According to the present disclosure, an abnormality determination method for transporting refrigeration apparatus determines an abnormality of a transporting refrigeration apparatus installed on a container. The transporting refrigeration apparatus includes a refrigerant circuit that connects a compressor, a condenser, a decompression device, and an evaporator. The abnormality determination method includes storing data related to operation of the transporting refrigeration apparatus in time order. The abnormality determination method further includes extracting, from the data related to operation of the transporting refrigeration apparatus, time series test data related to a same one of the test operating modes used in pre-trip inspection that is conducted multiple times before the container is loaded on a transporting device. The abnormality determination method further includes determining whether the transporting refrigeration apparatus has an abnormality based on a change trend of the extracted time series test data, and when there is no abnormality, estimating an abnormality occurrence time.

This configuration uses time series test data of a test operating mode obtained in the pre-trip inspection, so that whether the transporting refrigeration apparatus has an abnormality is determined while limiting variations in the operation state of the transporting refrigeration apparatus. When there is no abnormality, an abnormality occurrence time is estimated. The abnormality determination of the transporting refrigeration apparatus and the estimation of an abnormality occurrence time are accurately performed.

MODES FOR CARRYING OUT THE INVENTION

First Embodiment

A first embodiment of a transporting refrigeration apparatus, which is an example of a refrigeration apparatus (hereafter, simply referred to as "refrigeration apparatus 1"), will be described below with reference to the drawings. The refrigeration apparatus 1 is configured to freeze or refrigerate the inside of storage, for example, a shipping container or a road transportation trailer container. When the refrigeration apparatus 1 is mounted on a casing, the inside of the casing is divided into an interior accommodation space that circulates the air in the storage and an exterior accommodation space that circulates the air outside the storage.

Figure 1:
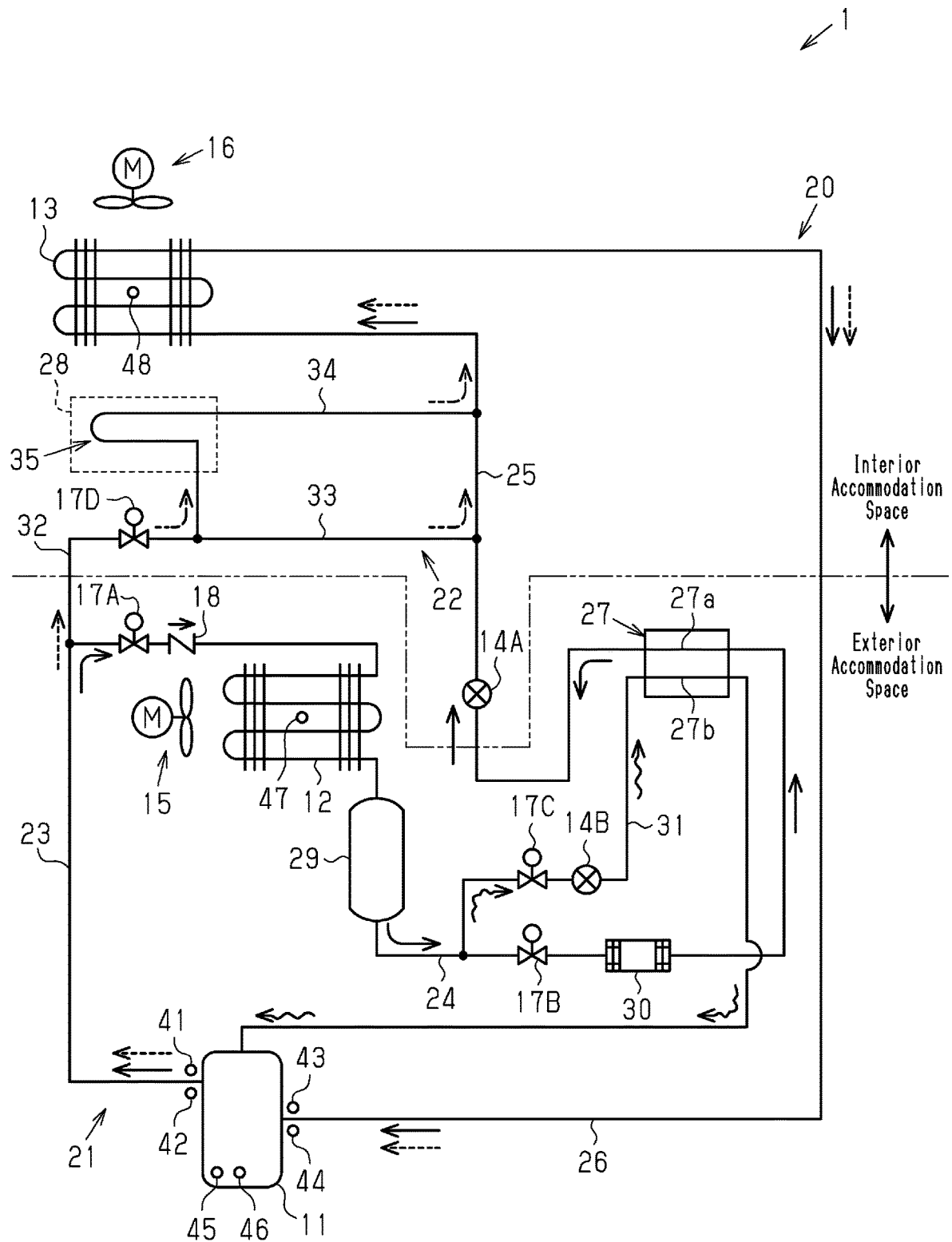
FIG. 1 is a conceptual diagram showing a first embodiment of a refrigeration apparatus.

As shown in FIG. 1, the refrigeration apparatus 1 includes a refrigerant circuit 20 in which a compressor 11, a condenser 12, a first expansion valve 14A that is an example of a decompression device, and an evaporator 13 are connected by a refrigerant pipe. The refrigerant circuit 20 includes a main circuit 21, a hot gas bypass circuit 22, and a liquid refrigerant bypass circuit 31.

In the main circuit 21, the compressor 11 that is motor-driven, the condenser 12, the first expansion valve 14A, and the evaporator 13 are sequentially connected in series by the refrigerant pipe.

As shown in FIG. 1, the exterior accommodation space accommodates the compressor 11, the condenser 12, the first expansion valve 14A, and an exterior fan 15 that circulates the air outside the storage to the condenser 12. The interior accommodation space accommodates the evaporator 13 and an interior fan 16 that circulates the air in the storage to the evaporator 13.

The compressor 11 may be, for example, a rotary compressor or a scroll compressor. The compressor 11 is configured so that the operating capacity is variable when an inverter controls the operating frequency to control the rotational speed.

The condenser 12 and the evaporator 13 may be a fin-and-tube heat exchanger. The condenser 12 exchanges heat between the air outside the storage supplied by the exterior fan 15 and the refrigerant circulating in the condenser 12. The evaporator 13 exchanges heat between the air in the storage supplied by the interior fan 16 and the refrigerant circulating in the evaporator 13. An example of the exterior fan 15 and the interior fan 16 is a propeller fan. A drain pan 28 is disposed below the evaporator 13. The drain pan 28 collects, for example, frost and ice blocks falling from the evaporator 13 and water condensed from the air.

The first expansion valve 14A may be, for example, an electric expansion valve having an opening degree that is variable using a pulse motor.

The compressor 11 and the condenser 12 are connected by a high-pressure gas pipe 23 that includes a first opening-closing valve 17A and a check valve 18 sequentially arranged in a direction in which the refrigerant flows. The first opening-closing valve 17A may be, for example, an electric expansion valve having an opening degree that is variable using a pulse motor. The check valve 18 allows the refrigerant to flow in the directions of the arrows shown in FIG. 1.

The condenser 12 and the first expansion valve 14A are connected by a high-pressure liquid pipe 24 that includes a receiver 29, a second opening-closing valve 17B, a dryer 30, and a supercooling heat exchanger 27 sequentially arranged in the direction in which the refrigerant flows. The second opening-closing valve 17B may be, for example, an electromagnetic valve capable of opening and closing.

The supercooling heat exchanger 27 includes a primary passage 27a and a secondary passage 27b configured to exchange heat with each other. The primary passage 27a is disposed in the main circuit 21 between the dryer 30 and the first expansion valve 14A. The secondary passage 27b is disposed in the liquid refrigerant bypass circuit 31. The liquid refrigerant bypass circuit 31 is a bypass circuit that connects the high-pressure liquid pipe 24 and an intermediate-pressure portion (not shown) of a compression mechanism of the compressor 11. A third opening-closing valve 17C and a second expansion valve 14B that is an example of a decompression device are sequentially connected, in the direction in which the high-pressure liquid refrigerant flows, to the liquid refrigerant bypass circuit 31 between the high-pressure liquid pipe 24 and the secondary passage 27b. In this configuration, when the liquid refrigerant flows into the liquid refrigerant bypass circuit 31 from the high-pressure liquid pipe 24, the second expansion valve 14B expands the liquid refrigerant to an intermediate pressure, so that the liquid refrigerant has a lower temperature than the liquid refrigerant flowing through the high-pressure liquid pipe 24 and flows to the secondary passage 27b. Thus, the high-pressure liquid refrigerant flowing through the primary passage 27a is supercooled by the refrigerant flowing through the secondary passage 27b. The third opening-closing valve 17C may be, for example, an electromagnetic valve capable of opening and closing. The second expansion valve 14B may be, for example, an electric expansion valve having an opening degree that is variable using a pulse motor.

The hot gas bypass circuit 22 connects the high-pressure gas pipe 23 and the inlet side of the evaporator 13 and sends the high-pressure high-temperature gas refrigerant discharged from the compressor 11 to the inlet side of the evaporator 13. The hot gas bypass circuit 22 includes a main passage 32, and a first branch passage 33 and a second branch passage 34 divided from the main passage 32. The first branch passage 33 and the second branch passage 34 are configured to be a parallel circuit in which one end of each of the first branch passage 33 and the second branch passage 34 is connected to the main passage 32 and the other end is connected to the inlet side of the evaporator 13, that is, a low-pressure connection pipe 25 that extends between the first expansion valve 14A and the evaporator 13. The main passage 32 includes a fourth opening-closing valve 17D. The fourth opening-closing valve 17D may be, for example, an electromagnetic valve capable of opening and closing. The first branch passage 33 includes only a pipe. The second branch passage 34 includes a drain pan heater 35. The drain pan heater 35 is disposed at the bottom of the drain pan 28 to heat the drain pan 28 with the refrigerant having a high temperature.

Figure 2:
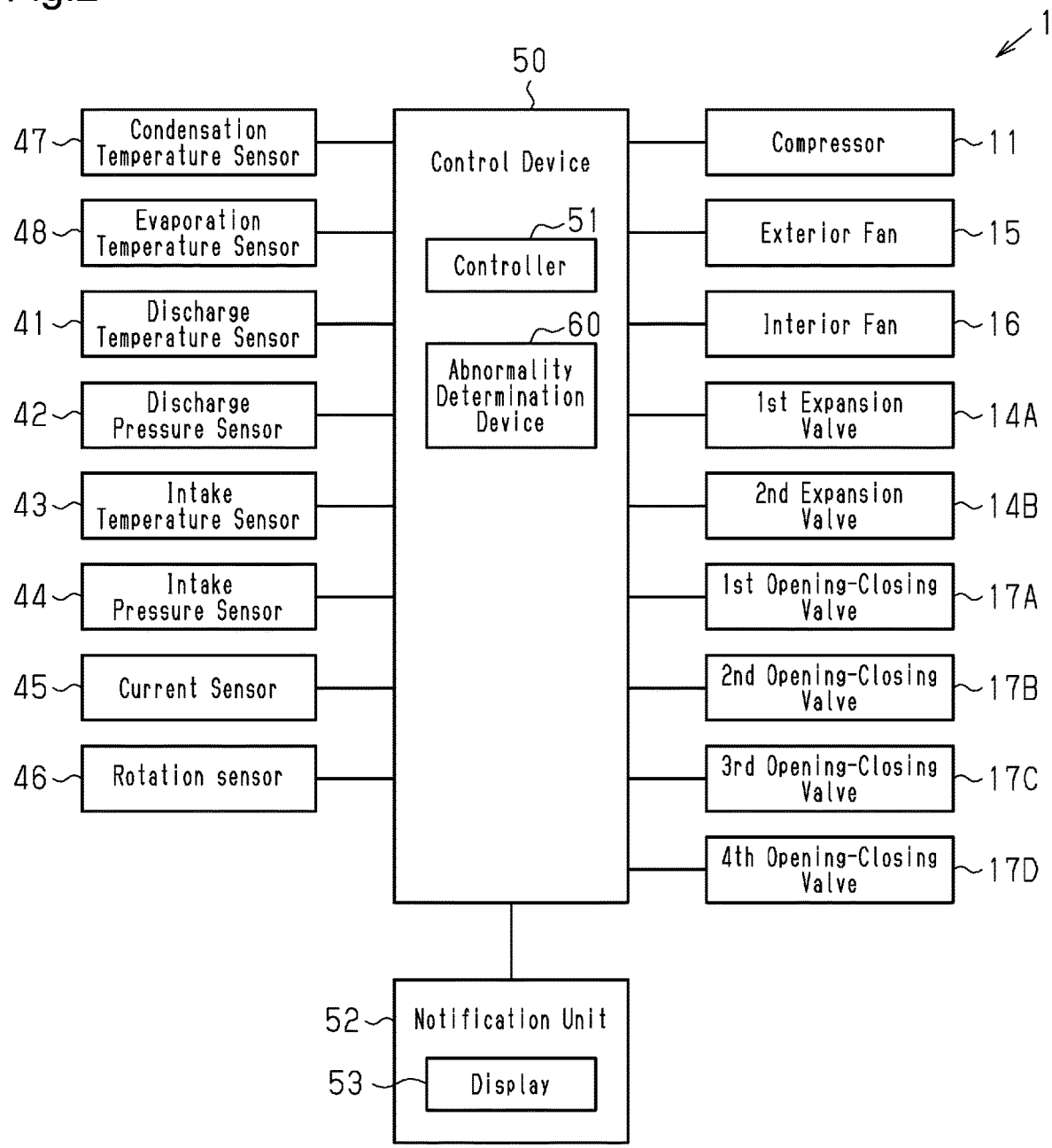
FIG. 2 is a block diagram showing electrical configurations of the refrigeration apparatus.

The refrigeration apparatus 1 includes various sensors. In an example, as shown in FIGS. 1 and 2, the refrigeration apparatus 1 includes a discharge temperature sensor 41, a discharge pressure sensor 42, an intake temperature sensor 43, an intake pressure sensor 44, a current sensor 45, a rotation sensor 46, a condensation temperature sensor 47, and an evaporation temperature sensor 48. The sensors 41 to 48 may be, for example, known sensors.

The discharge temperature sensor 41 and the discharge pressure sensor 42 are arranged, for example, on the high-pressure gas pipe 23 in the vicinity of a discharge port of the compressor 11. The discharge temperature sensor 41 outputs a signal corresponding to the temperature of a discharge gas refrigerant discharged from the compressor 11. The discharge pressure sensor 42 outputs a signal corresponding to the pressure of the discharge gas refrigerant discharged from the compressor 11. The intake temperature sensor 43 and the intake pressure sensor 44 are arranged, for example, on an intake pipe of the compressor 11, that is, a low-pressure gas pipe 26 in the vicinity of the intake port of the compressor 11. The intake temperature sensor 43 outputs a signal corresponding to the temperature of an intake gas refrigerant drawn into the compressor 11. The intake pressure sensor 44 outputs a signal corresponding to the pressure of the intake gas refrigerant drawn into the compressor 11. The current sensor 45 is arranged, for example, on an inverter circuit (inverter) that drives the motor of the compressor 11. The current sensor 45 outputs a signal corresponding to the amount of current flowing to the inverter circuit (inverter). The rotation sensor 46 is arranged, for example, on the motor of the compressor 11. The rotation sensor 46 outputs a signal corresponding to the rotational speed of the motor.

The condensation temperature sensor 47 is arranged, for example, on the condenser 12 and outputs a signal corresponding to the condensation temperature of the refrigerant flowing through the condenser 12. In the present embodiment, the condensation temperature sensor 47 is attached to, for example, an intermediate portion of the condenser 12. In this case, the condensation temperature sensor 47 obtains the temperature of the refrigerant in the intermediate portion of the condenser 12 as the condensation temperature and outputs a signal corresponding to the condensation temperature. The attachment position of the condensation temperature sensor 47 to the condenser 12 may be changed in any manner.

The evaporation temperature sensor 48 is arranged, for example, on the evaporator 13 and outputs a signal corresponding to the evaporation temperature of the refrigerant flowing through the evaporator 13. In the present embodiment, the evaporation temperature sensor 48 is attached to, for example, an intermediate portion of the evaporator 13. In this case, the evaporation temperature sensor 48 obtains the temperature of the refrigerant in the intermediate portion of the evaporator 13 as the evaporation temperature and outputs a signal corresponding to the evaporation temperature. The attachment position of the evaporation temperature sensor 48 to the evaporator 13 may be changed in any manner.

As shown in FIG. 2, the refrigeration apparatus 1 includes a control device 50 that controls operation of the refrigeration apparatus 1 and a notification unit 52. The control device 50 is electrically connected to each of the discharge temperature sensor 41, the discharge pressure sensor 42, the intake temperature sensor 43, the intake pressure sensor 44, the current sensor 45, the rotation sensor 46, the condensation temperature sensor 47, and the evaporation temperature sensor 48. The control device 50 is also electrically connected to the compressor 11, the first expansion valve 14A, the second expansion valve 14B, the exterior fan 15, the interior fan 16, the first opening-closing valve 17A, the second opening-closing valve 17B, the third opening-closing valve 17C, the fourth opening-closing valve 17D, and the notification unit 52. The notification unit 52 notifies information related to the refrigeration apparatus 1 to the outside of the refrigeration apparatus 1. The notification unit 52 includes, for example, a display 53 that shows information related to the refrigeration apparatus 1. The notification unit 52 may include a speaker instead of or in addition to the display 53. In this case, the notification unit 52 may issue notification of information related to the refrigeration apparatus 1 with sound.

The control device 50 includes a controller 51. The controller 51 includes, for example, an arithmetic unit that executes a predetermined control program and a storage unit. The arithmetic unit includes, for example, a central processing unit (CPU) or a micro processing unit (MPU). The storage unit stores various control programs and information used for various control processes. The storage unit includes, for example, nonvolatile memory and volatile memory. The controller 51 controls the compressor 11, the expansion valves 14A and 14B, the exterior fan 15, the interior fan 16, and the opening-closing valves 17A to 17D based on detection results of the sensors 41 to 48. The refrigeration apparatus 1 executes a refrigerating operation, a cooling operation, and a defrosting operation using the controller 51.

Refrigerating Operation and Cooling Operation

The refrigerating operation sets the storage temperature to below 0° C. and, for example, sets a storage set temperature to a predetermined temperature that is lower than 0° C. (e.g., −18° C.). The cooling operation sets the storage temperature to 0° C. or higher and, for example, sets the storage set temperature to be 0° C. or higher and lower than 10° C. (e.g., 0° C.). In the refrigerating operation and the cooling operation, the first opening-closing valve 17A, the second opening-closing valve 17B, and the third opening-closing valve 17C are open, and the fourth opening-closing valve 17D is closed. The opening degree of each of the first expansion valve 14A and the second expansion valve 14B is appropriately adjusted. Also, the compressor 11, the exterior fan 15, and the interior fan 16 are operated.

During the refrigerating operation and the cooling operation, the refrigerant circulates as indicated by the solid arrows shown in FIG. 1. More specifically, a high-pressure gas refrigerant compressed in the compressor 11 is condensed to become a liquid refrigerant in the condenser 12 and then is stored in the receiver 29. The liquid refrigerant stored in the receiver 29 flows through the second opening-closing valve 17B and the dryer 30. The liquid refrigerant is supercooled to become a supercooled liquid refrigerant in the primary passage 27a of the supercooling heat exchanger 27 and flows to the first expansion valve 14A. As indicated by the wave arrows shown in FIG. 1, some of the liquid refrigerant discharged from the receiver 29 flows as a supercooling source through the third opening-closing valve 17C and the second expansion valve 14B to become an intermediate-pressure refrigerant. The intermediate-pressure refrigerant flows to the secondary passage 27b of the supercooling heat exchanger 27 to cool the liquid refrigerant in the primary passage 27a. The liquid refrigerant supercooled in the supercooling heat exchanger 27 is decompressed in the first expansion valve 14A and then flows to the evaporator 13. In the evaporator 13, a low-pressure liquid refrigerant absorbs heat from the air in the storage and evaporates. As a result, the air in the storage is cooled. The low-pressure gas refrigerant evaporated in the evaporator 13 is drawn into the compressor 11 and compressed again. The intermediate-pressure liquid refrigerant flowing to the secondary passage 27b is heated by the liquid refrigerant in the primary passage 27a to become an intermediate-pressure gas refrigerant and returns to the intermediate-pressure portion of the compression mechanism of the compressor 11.

Defrosting Operation

When the refrigerating operation or the cooling operation continuously performed, frost collects on surfaces of, for example, a fin and a heat transfer tube of the evaporator 13. The frost gradually develops and enlarges. The controller 51 performs the defrosting operation, that is, an operation for defrosting the evaporator 13.

As indicted by the broken arrows shown in FIG. 1, the defrosting operation allows a high-temperature high-pressure gas refrigerant that is compressed in and discharged from the compressor 11 to flow to the inlet side of the evaporator 13 through a bypass to defrost the evaporator 13. In the defrosting operation, the fourth opening-closing valve 17D is open, and the first opening-closing valve 17A, the second opening-closing valve 17B, the third opening-closing valve 17C, and the second expansion valve 14B are fully closed. While the compressor 11 is operated, the exterior fan 15 and the interior fan 16 are stopped.

The high-pressure high-temperature gas refrigerant compressed in and discharged from the compressor 11 flows through the main passage 32 and then the fourth opening-closing valve 17D and is divided into the first branch passage 33 and the second branch passage 34. The refrigerant divided into the second branch passage 34 flows through the drain pan heater 35. The refrigerant discharged from the drain pan heater 35 joins the refrigerant that has passed through the first branch passage 33 and flows to the evaporator 13. In the evaporator 13, a high-pressure gas refrigerant (so-called hot gas) flows in the heat transfer tube. Thus, in the evaporator 13, the frost collected on the heat transfer tube and the fin is gradually heated by the high-temperature gas refrigerant. As a result, the drain pan 28 gradually receives the frost from the evaporator 13. The refrigerant used to defrost the evaporator 13 is drawn into the compressor 11 and compressed again. The drain pan 28 receives, for example, an ice block that falls from the surface of the evaporator 13 in addition to water, that is, melted frost. The ice block is heated and melted by the refrigerant flowing in the drain pan heater 35. The melted water is discharged out of the storage through a predetermined flow passage.

As shown in FIG. 2, the control device 50 further includes an abnormality determination device 60 that determines whether the refrigeration apparatus 1 has an abnormality and, when there is no abnormality, estimates an abnormality occurrence time of the refrigeration apparatus 1. The abnormality of the refrigeration apparatus 1 includes an abnormality of the compressor 11 and an abnormality related to refrigerant leak (e.g., slow leak) of the refrigerant circuit 20. The present embodiment focuses on the abnormality of the compressor 11 as the abnormality of the refrigeration apparatus 1.

The abnormality of the compressor 11 includes a decrease in the compression efficiency of the compressor 11 caused by the refrigerant leak from the compression mechanism of the compressor 11 and an increase in the supply of current to the compressor 11 caused by a damaged bearing of the compressor 11 due to aging and deterioration. The abnormality determination device 60, for example, monitors a polytropic index of the compressor 11 to determine whether the compressor 11 has an abnormality caused by an excessive decrease in the compression efficiency of the compressor 11. When the compressor 11 has no abnormality, the abnormality determination device 60 estimates a time at which the abnormality of the compressor 11 will occur due to an excessive decrease in the compression efficiency of the compressor 11 based on a change trend of the polytropic index. In addition, the abnormality determination device 60 monitors the supply of current to the compressor 11 to determine whether the compressor 11 has an abnormality. When the compressor 11 has no abnormality, the abnormality determination device 60 estimates a time at which the abnormality of the compressor 11 will occur based on a change trend of the supply of current to the compressor 11.

Figure 3:
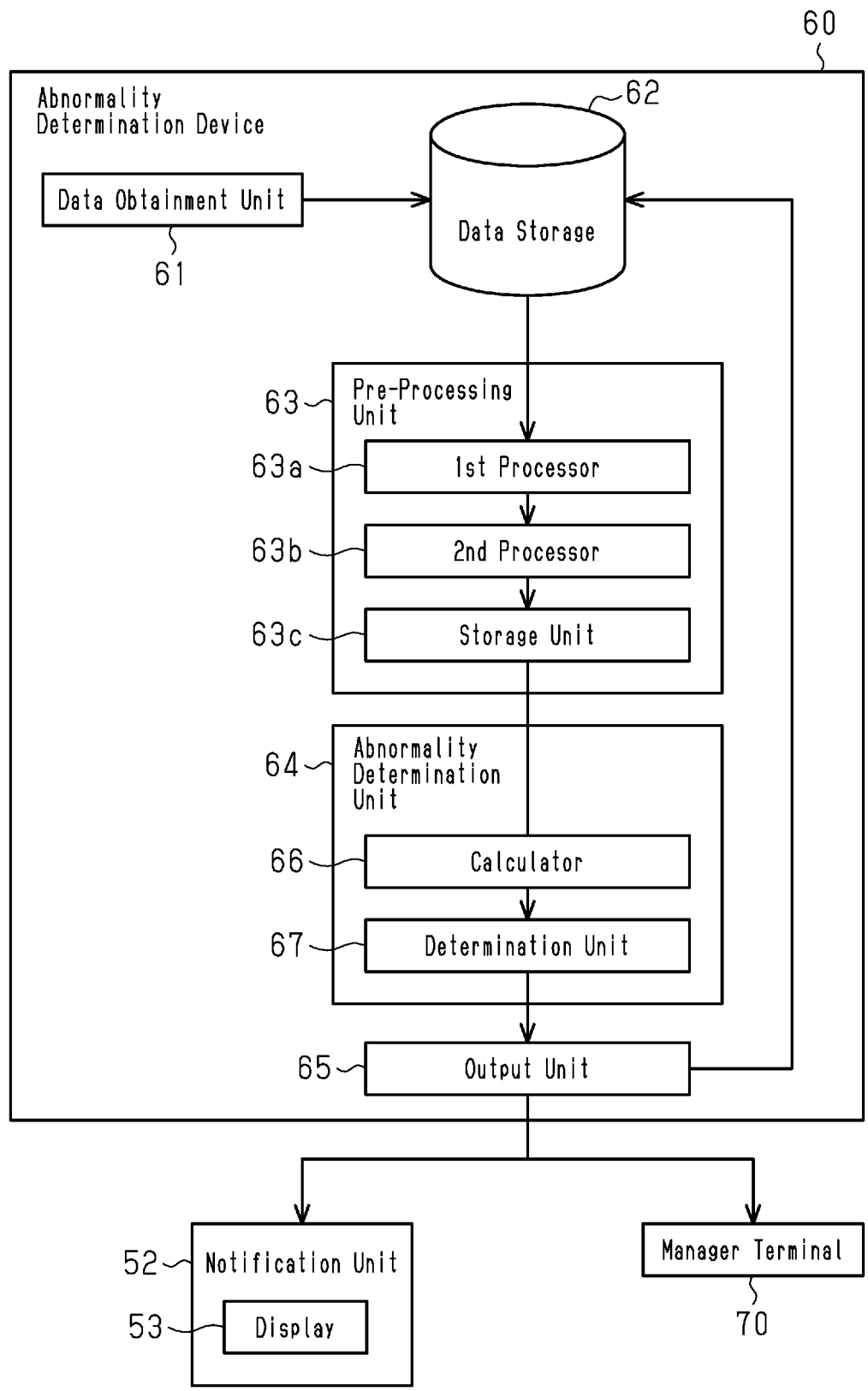
FIG. 3 is a block diagram showing electrical configurations of an abnormality determination device of the refrigeration apparatus.

As shown in FIG. 3, the abnormality determination device 60 includes a data obtainment unit 61, data storage 62, a pre-processing unit 63, an abnormality determination unit 64, and an output unit 65.

The data obtainment unit 61 is connected to the sensors 41 to 48 to communicate with the sensors 41 to 48. The data obtainment unit 61 receives time series data from the sensors 41 to 48. In an example, each of the sensors 41 to 48 outputs a detection result to the abnormality determination device 60 in each predetermined time TX. An example of the predetermined time TX is one hour. In an example, each of the sensors 41 to 48 stores detection results detected in a predetermined sampling cycle for the predetermined time TX and outputs an average of the detection results in the predetermined time TX to the abnormality determination device 60. Each of the sensors 41 to 48 may output a detection result detected at a clock time specified in each predetermined time TX to the abnormality determination device 60.

Figure 4A:
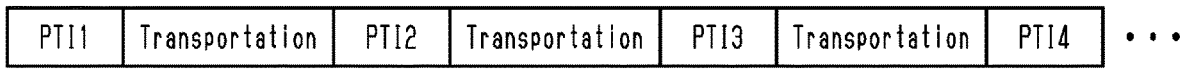
FIG. 4A shows time series operation data of the refrigeration apparatus.

The data storage 62 is electrically connected to the data obtainment unit 61. The data storage 62 receives data from the data obtainment unit 61. The data storage 62 stores data from the data obtainment unit 61. The data storage 62 sequentially stores data from the data obtainment unit 61 in time order. The data storage 62 sequentially stores data related to operation of the refrigeration apparatus 1 (hereafter, the data may be referred to as "operation data") in time order. FIG. 4A shows an example of operation data stored in the data storage 62. As shown in FIG. 4A, the refrigeration apparatus 1 alternately stores test data of pre-trip inspection (PTI), which is conducted before a container on which the refrigeration apparatus 1 is installed is loaded on a transporting device, and operation data that are obtained during transportation of the container loaded on the transporting device. In the pre-trip inspection (PTI), a test operation of the refrigeration apparatus 1 is performed in different types of test operating mode. In the pre-trip inspection, cargo is not loaded in the container.

In the present embodiment, the data storage 62 is configured to be a memory medium incorporated in the abnormality determination device 60. In this case, the data storage 62 may include, for example, nonvolatile memory and volatile memory. The data storage 62 may be a memory medium provided outside the abnormality determination device 60 or outside the refrigeration apparatus 1. In this case, the data storage 62 may include at least one of universe serial bus (USB) memory, a secure digital (SD) memory card, and a hard disk drive (HDD) memory medium.

The pre-processing unit 63 extracts operation data that are used to determine whether the compressor 11 has an abnormality and to estimate an abnormality occurrence time of the compressor 11 from the time series operation data of the refrigeration apparatus 1. The pre-processing unit 63 removes noise operation data from the extracted operation data and replaces the section corresponding to the removed operation data with alternative data. The pre-processing unit 63 includes a first processor 63a, a second processor 63b, and a storage unit 63c. The noise data includes operation data having momentary variations that occur, for example, immediately after activation of the compressor 11.

The first processor 63a is electrically connected to the data storage 62. The second processor 63b is electrically connected to the first processor 63a. The storage unit 63c is electrically connected to the second processor 63b.

Figure 4B:
FIG. 4B shows test data of pre-trip inspection extracted from the operation data.

As shown in FIG. 4B, the first processor 63a extracts time series test data of the pre-trip inspection from the time series operation data of the data storage 62 shown in FIG. 4A. The time series test data are used to determine whether the compressor 11 has an abnormality and to estimate the abnormality occurrence time of the compressor 11. That is, the first processor 63a does not extract the operation data of the refrigeration apparatus 1 obtained during transportation of the container with the transporting device.

Figure 5A:
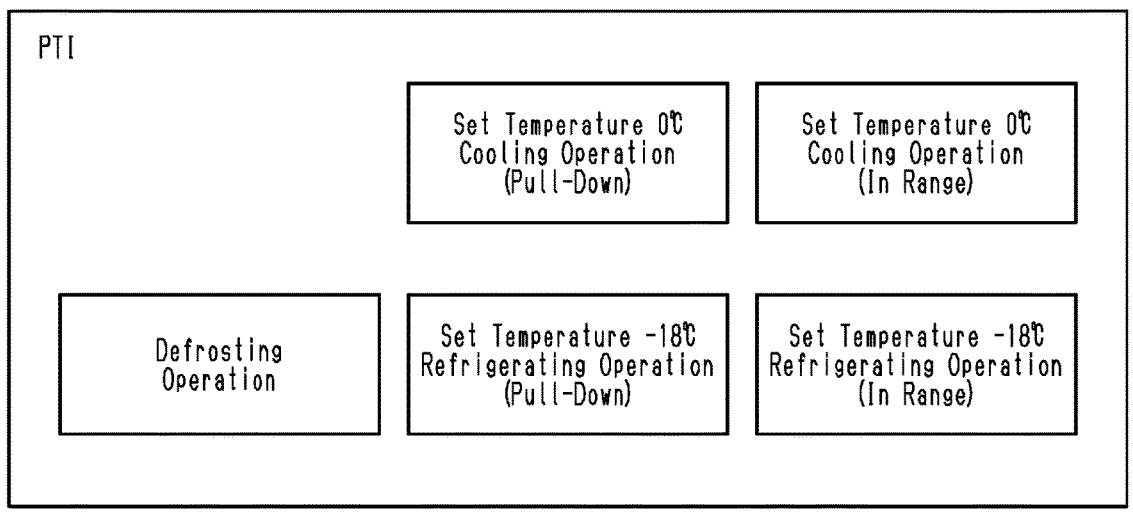
FIG. 5A shows a list of test operating modes used in pre-trip inspection.

FIG. 5A shows multiple test operating modes (test operating items) used in the pre-trip inspection. In the present embodiment, the multiple test operating modes include a cooling operation (pull-down), a cooling operation (in range), a defrosting operation, a refrigerating operation (pull-down), and a refrigerating operation (in range). The cooling operation (pull-down) refers to an operation performed during a period from when the storage set temperature is, for example, 0° C. and the refrigeration apparatus 1 starts to be operated until the actual storage temperature is decreased to near the storage set temperature. The cooling operation (in range) refers to an operation that executes feedback control to maintain the actual storage temperature at the storage set temperature (0° C.) for a predetermined first test period after the cooling operation (pull-down). The defrosting operation is performed for a predetermined second test period. The refrigerating operation (pull-down) refers to an operation performed during a period from when the storage set temperature is lower than the storage set temperature of the cooling operation, which is, for example, −18° C., and the refrigeration apparatus 1 starts to be operated until the actual storage temperature is decreased to near the storage set temperature. The refrigerating operation (in range) refers to an operation that executes feedback control to maintain the actual storage temperature at the storage set temperature (−18° C.) for a predetermined third test period. The first test period, the second test period, and the third test period may be the same or differ from each other. The first test period, the second test period, and the third test period may be changed in any manner. The defrosting operation may be performed until the temperature of the condenser 12 reaches a predetermined set temperature instead of for the third test period.

Figure 5B:
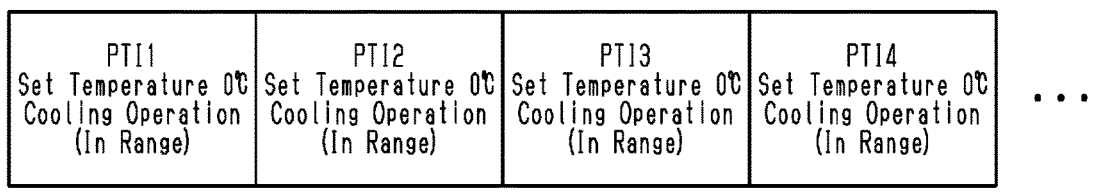
FIG. 5B shows test data in which cooling operations (in range) are extracted and joined in time order.

The first processor 63a extracts time series test data for each test operating mode from the test data of the pre-trip inspection shown in FIG. 4B. More specifically, the first processor 63a extracts time series test data related to a same one of the test operating modes. In an example, as shown in FIG. 5B, test data of each pre-trip inspection for the cooling operation (in range) are extracted, arranged in time order, and transmitted to the second processor 63b. The first processor 63a also extracts test data of each pre-trip inspection for other test operating modes, arranges the test data in time order, and outputs the test data to the second processor 63b.

In addition, before the transmission to the second processor 63b, the first processor 63a extracts a section that is replaced with alternative data or a section from which test data is removed. The section replaced with alternative data includes, for example, a section immediately after activation of the compressor 11. The section from which test data is removed includes, for example, at least one of a section in which the refrigeration apparatus 1 is stopped, a section immediately after deactivation of the compressor 11, and a section immediately after the operation of the compressor 11 is switched. In the present embodiment, the first processor 63a extracts all of the section in which the refrigeration apparatus 1 is stopped, a section immediately after activation of the compressor 11, the section immediately after deactivation of the compressor 11, and the section immediately after the operation of the compressor 11 is switched.

The second processor 63b inputs alternative data into the section immediately after activation of the compressor 11 extracted by the first processor 63a. The alternative data is a value before or after the section immediately after activation of the compressor 11 or a predetermined representative value. When the first processor 63a extracts the section immediately after activation of the compressor 11, the second processor 63b uses the value after the section immediately after activation of the compressor 11 as the alternative data. The value after the section immediately after activation of the compressor 11 may be an average value of data obtained during a predetermined period after the section immediately after activation of the compressor 11 or data obtained at a time immediately after the section which was taken immediately after activation of the compressor 11. As the process for calculating alternative data, data obtained before and after the section that is replaced with the alternative data may be interpolated (e.g., linearly interpolated), and the calculated value may be used as the alternative data.

The second processor 63b removes test data of the section during which the refrigeration apparatus 1 is stopped, the section immediately after activation of the compressor 11, the section immediately after deactivation of the compressor 11, and the section immediately after the operation of the compressor 11 is switched, which are extracted by the first processor 63a. The second processor 63b outputs the test data that have undergone the extraction process to the storage unit 63c.

The storage unit 63c includes, for example, volatile memory and nonvolatile memory. The first processor 63a and the second processor 63b remove operation data acting as noise from the operation data that is used to determine whether the compressor 11 has an abnormality or estimate the abnormality occurrence time of the compressor 11, and replace the section of the removed operation data with alternative data. Then, the operation data is stored in the storage unit 63c. More specifically, the storage unit 63c stores test data of each test operating mode obtained in the pre-trip inspection in separate storage regions. In an example, when the pre-trip inspection is conducted multiple times, consecutive data of the pre-trip inspection for each test operating mode are stored in the storage unit 63c in the order of conducting the pre-trip inspection. More specifically, when the pre-trip inspection is conducted multiple times, consecutive data of the cooling operation (pull-down) are stored in a first storage region of the storage unit 63c in accordance with the conducting order of the pre-trip inspection. When the pre-trip inspection is conducted multiple times, consecutive data of the cooling operation (in range) are stored in a second storage region of the storage unit 63c in accordance with the conducting order of the pre-trip inspection. When the pre-trip inspection is conducted multiple times, consecutive data of the defrosting operation are stored in a third storage region of the storage unit 63c in accordance with the conducting order of the pre-trip inspection. When the pre-trip inspection is conducted multiple times, consecutive data of the refrigerating operation (pull-down) are stored in a fourth storage region of the storage unit 63c in accordance with the conducting order of the pre-trip inspection. When the pre-trip inspection is conducted multiple times, consecutive data of the refrigerating operation (in range) are stored in a fifth storage region of the storage unit 63c in accordance with the conducting order of the pre-trip inspection.

In the present embodiment, the pre-processing unit 63 includes the storage unit 63c. Instead, the abnormality determination unit 64 may include the storage unit 63c. In any configuration, the abnormality determination device 60 obtains time series test data in the pre-trip inspection after the refrigeration apparatus 1 is installed on a container.

The abnormality determination unit 64 is electrically connected to the pre-processing unit 63. The abnormality determination unit 64 uses the test data that has undergone the extraction process of the pre-processing unit 63 to determine whether the compressor 11 has an abnormality and, when the compressor 11 has no abnormality, estimates an abnormality occurrence time of the compressor 11. The abnormality determination unit 64 includes a calculator 66 and a determination unit 67.

The calculator 66 is electrically connected to the storage unit 63c. The calculator 66 obtains, from each storage region of the storage unit 63c, time series test data related to the same one of the test operating modes when the pre-trip inspection is conducted multiple times. The calculator 66 calculates a deviation degree of the compressor 11 from the normal state based on the obtained time series test data. In the present embodiment, the calculator 66 calculates the deviation degree of the compressor 11 from the normal state based on test data of all of the pre-trip inspections from when the refrigeration apparatus 1 is installed on the container up to the present time.

The calculator 66 also calculates the deviation degree of the compressor 11 from the normal state for each test operating mode of the pre-trip inspection. More specifically, the calculator 66 obtains time series test data of all of the pre-trip inspections for the cooling operation (pull-down) from the first storage region of the storage unit 63c and calculates a deviation degree of the compressor 11 from the normal state based on the obtained time series test data. The calculator 66 obtains time series test data of all of the pre-trip inspections for the cooling operation (in range) from the second storage region of the storage unit 63c and calculates a deviation degree of the compressor 11 from the normal state based on the obtained time series test data. The calculator 66 obtains time series test data of all of the pre-trip inspections for the defrosting operation from the third storage region of the storage unit 63c and calculates a deviation degree of the compressor 11 from the normal state based on the obtained time series test data. The calculator 66 obtains time series test data of all of the pre-trip inspections for the refrigerating operation (pull-down) from the fourth storage region of the storage unit 63c and calculates a deviation degree of the compressor 11 from the normal state based on the obtained time series test data. The calculator 66 obtains time series test data of all of the pre-trip inspections for the refrigerating operation (in range) from the fifth storage region of the storage unit 63c and calculates a deviation degree of the compressor 11 from the normal state based on the obtained time series test data.

To calculate the deviation degree of the compressor 11 from the normal state, the calculator 66 calculates a first index value and a second index value from time series test data obtained from each storage region of the storage unit 63c. In the present embodiment, the calculator 66 calculates the first index value and the second index value for each test operating mode. The calculator 66 calculates the first index value from time series test data related to the same one of the test operating modes and obtained in a first period when the pre-trip inspection is conducted multiple times. Also, the calculator 66 calculates the second index value from time series test data related to the same one of the test operating modes and obtained in a second period, which differs in length from the first period, when the pre-trip inspection is conducted multiple times. The calculator 66 is configured to obtain, from each storage region of the storage unit 63c, the time series test data related to the same one of the test operating modes when the pre-trip inspection is conducted multiple times.

The calculator 66 calculates the deviation degree of the compressor 11 from the normal state based on the first index value and the second index value. In the present embodiment, the calculator 66 calculates the deviation degree of the compressor 11 from the normal state based on a deviation degree between the first index value and the second index value. The calculator 66 calculates the deviation degree of the compressor 11 from the normal state for each test operating mode. The calculator 66 outputs the calculation results to the determination unit 67.

The determination unit 67 determines whether the refrigeration apparatus 1 has an abnormality based on a change trend in the time series test data related to the same one of the test operating modes when the pre-trip inspection is conducted multiple times. When there is no abnormality, the determination unit 67 estimates the abnormality occurrence time. In the present embodiment, the determination unit 67 determines whether the refrigeration apparatus 1 has an abnormality based on a change trend in time series test data obtained in all of the pre-trip inspections and related to the same one of the test operating modes. When there is no abnormality, the determination unit 67 estimates the abnormality occurrence time.

The determination unit 67 determines whether the refrigeration apparatus 1 has an abnormality (in the present embodiment, whether the compressor 11 has an abnormality) based on the deviation degree of the compressor 11 from the normal state, which is calculated by the calculator 66, as the change trend in time series test data for each test operating mode. When there is no abnormality, the determination unit 67 estimates the abnormality occurrence time. The determination unit 67 outputs a determination result of whether the compressor 11 has an abnormality to the output unit 65. When there is no abnormality of the compressor 11, the determination unit 67 outputs an estimation result of abnormality occurrence time of the compressor 11 to the output unit 65.

The output unit 65 is electrically connected to the data storage 62 and the notification unit 52. The output unit 65 outputs the determination result of whether the compressor 11 has an abnormality or the estimation result of the abnormality occurrence time of the compressor 11 to the data storage 62 and the notification unit 52. The notification unit 52 uses, for example, the display 53 to show the determination result of whether the compressor 11 has an abnormality, and to show the estimation result of the abnormality occurrence time of the compressor 11 when there is no abnormality of the compressor 11. The output unit 65 further includes a wireless communicator including an antenna. The output unit 65 is configured to communicate with a terminal of a manager (manager terminal 70) through the wireless communicator. The output unit 65 outputs the determination result of whether the compressor 11 has an abnormality to the manager terminal 70. When there is no abnormality of the compressor 11, the output unit 65 outputs the estimation result of the abnormality occurrence time of the compressor 11 to the manager terminal 70. The manager terminal 70 may be a mobile communication device such as a smartphone or a tablet computer or may be a desktop personal computer.

The determination of whether the compressor 11 has an abnormality and the estimation of abnormality occurrence time of the compressor 11, which are performed by the abnormality determination unit 64, will now be described in detail.

The calculator 66 uses time series test data for each test operating mode in the pre-trip inspection extracted by the pre-processing unit 63 to calculate the first index value for each test operating mode in a moving average of time series test data in the first period and calculate the second index value for each test operating mode in a moving average of time series test data in the second period. The calculator 66 calculates the first index value and the second index value using test data in the first period and the second period that are before execution of the process. The calculator 66 calculates the deviation degree between the first index value and the second index value for each test operating mode. The first period refers to, for example, a period in which the test operating modes are executed for one cycle of the pre-trip inspection (e.g., three hours). The second period refers to, for example, a period in which the test operating modes are executed for four cycles of the pre-trip inspection (e.g., twelve hours). The first period and the second period may be changed in any manner. The first period may be a period in which the test operating modes are executed for multiple cycles of the pre-trip inspection. It is preferred that the second period is longer than the first period. In the second period, for example, the test operating modes may be executed for five or more cycles of the pre-trip inspection.

The first index value and the second index value include a first example and a second example that are described as follows. In the first example, each of the first index value and the second index value is a polytropic index. In the second example, each of the first index value and the second index value is a compressor current ratio. The compressor current ratio is expressed by a ratio of an actual value of current supplied to the compressor 11 to an estimation value of current supplied to the compressor 11. In the present embodiment, the ratio of the actual value of current supplied to the compressor 11 to the estimation value of current supplied to the compressor 11 is defined as the compressor current ratio.

The first example of the first index value and the second index value will be described.

The abnormality determination device 60 calculates a polytropic index. The polytropic index will be described with reference to FIG. 6. In a vapor compression refrigeration cycle such as the refrigeration apparatus 1, as shown in a Mollier diagram (pressure-enthalpy chart) of FIG. 6, the refrigerant circulates in the refrigerant circuit 20 as the refrigerant is compressed from point A to point B in a compression process and then cooled from point B to point C in a condensation process, decompressed from point C to point D in an expansion process, and heated from point D to point A in an evaporation process. In this refrigeration cycle, the compression efficiency of the compressor 11 is expressed by a polytropic index. The polytropic index is a value calculated from states of an intake gas refrigerant and a discharge gas refrigerant of the compressor 11 and shows the relationship between pressure and a specific volume of the refrigerant when compressed. The polytropic index is a value unique to the compressor forming the refrigeration cycle. This value determines a curve of the compression process (in FIG. 6, approximately indicated by a straight line).

Figure 6:
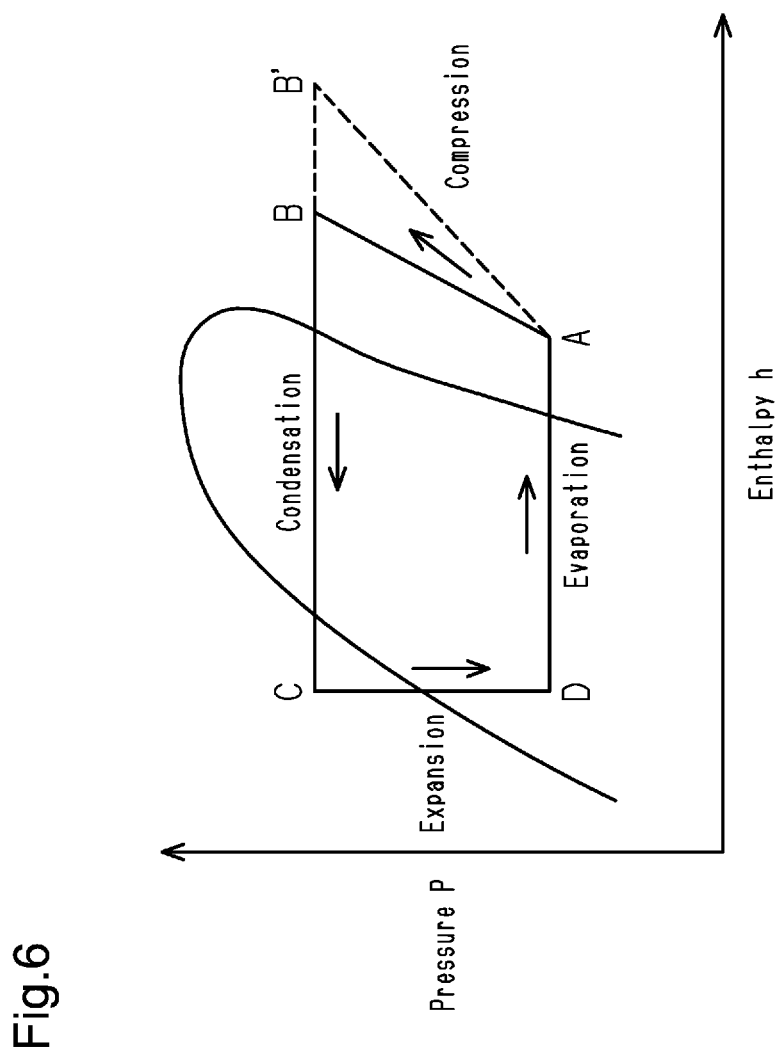
FIG. 6 is a graph showing an example of the relationship between enthalpy and pressure of the refrigeration apparatus.

For example, when the amount of the refrigerant leaked from the high-pressure side to the low-pressure side in the compressor 11 is increased due to deterioration of the compressor 11, the value of the polytropic index changes (increases). This results in a change in the slope of the compression process curve. In FIG. 6, the compression process curve, indicated by the solid line, shows an initial compression state at installation. The compression process curve indicated by the broken line shows a compression state when the compressor 11 has deteriorated. As shown in the compression process shown in FIG. 6, when the compressor 11 has deteriorated, in the compression process, the refrigerant is compressed from point A toward point B', which corresponds to a greater enthalpy than point B. Thus, deterioration of the compressor 11 increases the slope of the compression process curve.

A polytropic index is typically calculated by the following equation.

$$n = \frac{1}{1 - \log_{\frac{P1}{P2}}\left(\frac{T1}{T2}\right)} \qquad \text{[Equation 1]}$$

In Equation 1, "n" denotes a polytropic index, "T1" denotes a temperature of the intake gas refrigerant of the compressor 11, "T2" denotes a temperature of the discharge gas refrigerant of the compressor 11, "P1" denotes pressure of the intake gas refrigerant of the compressor 11, and "P2" denotes pressure of the discharge gas refrigerant of the compressor 11. The abnormality determination device 60 calculates temperature T1 from a signal of the intake temperature sensor 43, temperature T2 from a signal of the discharge temperature sensor 41, pressure P1 from a signal of the intake pressure sensor 44, and pressure P2 from a signal of the discharge pressure sensor 42. When the abnormality determination device 60 does not calculate temperatures T1 and T2 and pressures P1 and P2, the controller 51 may calculate temperatures T1 and T2 and pressures P1 and P2. In this case, when the controller 51 outputs temperatures T1 and T2 and pressures P1 and P2 to the abnormality determination device 60, the abnormality determination device 60 obtains temperatures T1 and T2, and pressures P1 and P2.

Figure 7A:
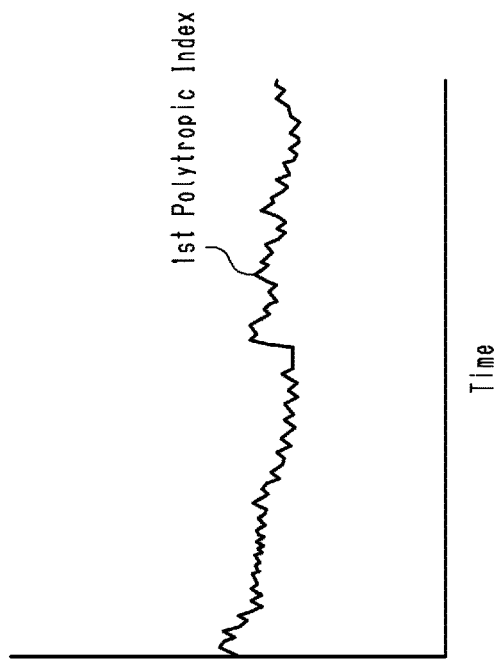
FIGS. 7A, 7B, 7C, and 7D are graphs showing examples of changes in a polytropic index of each pre-trip inspection.
Figure 7B:
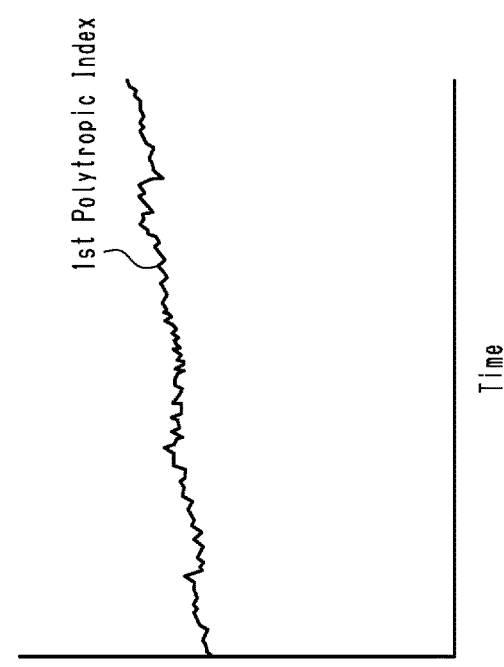
Figure 7C:
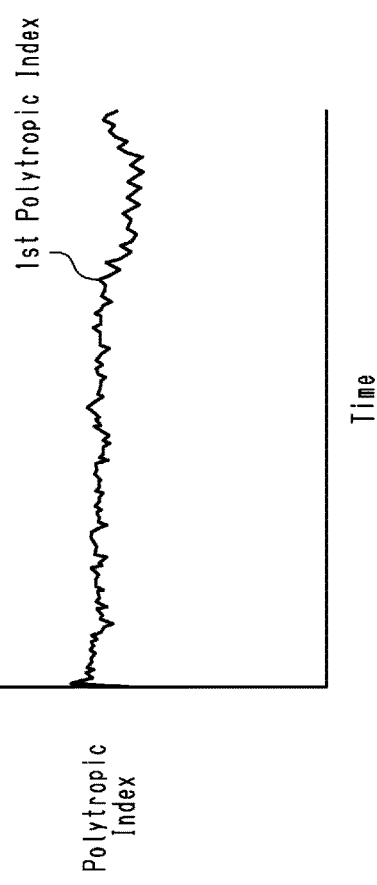
Figure 7D:
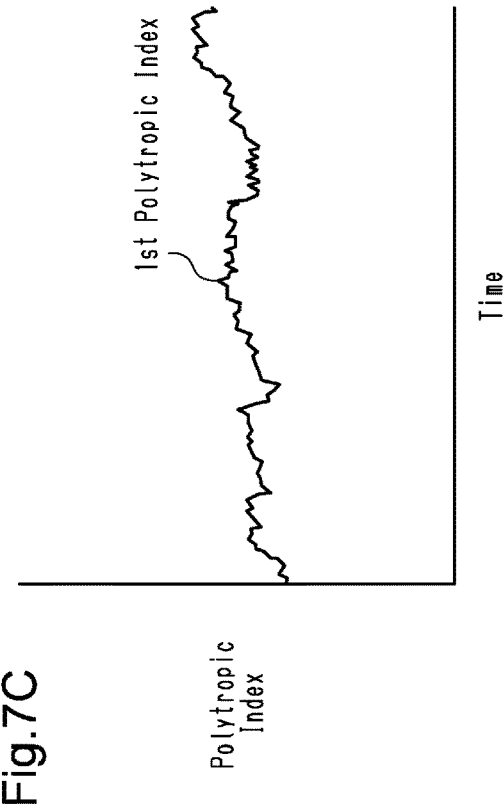

The calculator 66 calculates a polytropic index in the first period (hereafter, referred to as "first polytropic index") as the first index value and calculates a polytropic index in the second period (hereafter, referred to as "second polytropic index") as the second index value. FIG. 7A shows an example of changes in the first polytropic index calculated from results of the cooling operation (in range) of the first pre-trip inspection after installation of the refrigeration apparatus 1. FIG. 7B shows changes in the first polytropic index calculated from results of the cooling operation (in range) of the second pre-trip inspection. FIG. 7C shows changes in the first polytropic index calculated from results of the cooling operation (in range) of the third pre-trip inspection. FIG. 7D shows changes in the first polytropic index calculated from results of the cooling operation (in range) of the fourth pre-trip inspection.

Figure 8A:
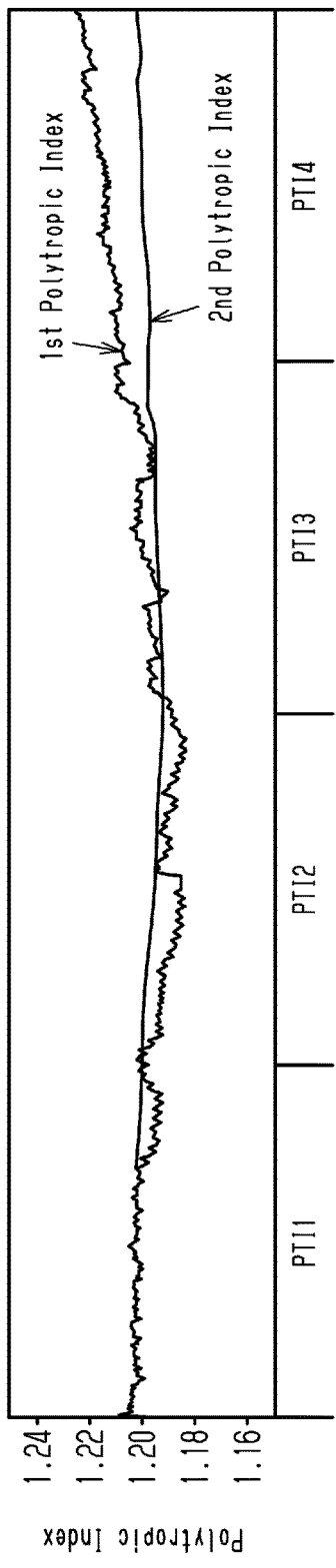
FIG. 8A is a graph showing an example of changes in a polytropic index of the refrigeration apparatus obtained by joining FIGS. 7A to 7D in time order.

FIG. 8A is a graph that joins the test data of FIGS. 7A to 7D in time order. The graph shown in FIG. 8A shows changes in the first polytropic index and the second polytropic index of test data of the cooling operation (in range) obtained from the consecutive pre-trip inspections. As shown in FIG. 8A, the first polytropic index is substantially equal to the second polytropic index up to the cooling operation (in range) of the second pre-trip inspection. However, in the cooling operation (in range) of the third pre-trip inspection, the deviation degree gradually increases. In the cooling operation (in range) of the fourth pre-trip inspection, the deviation degree increases as time elapses.

Figure 8B:
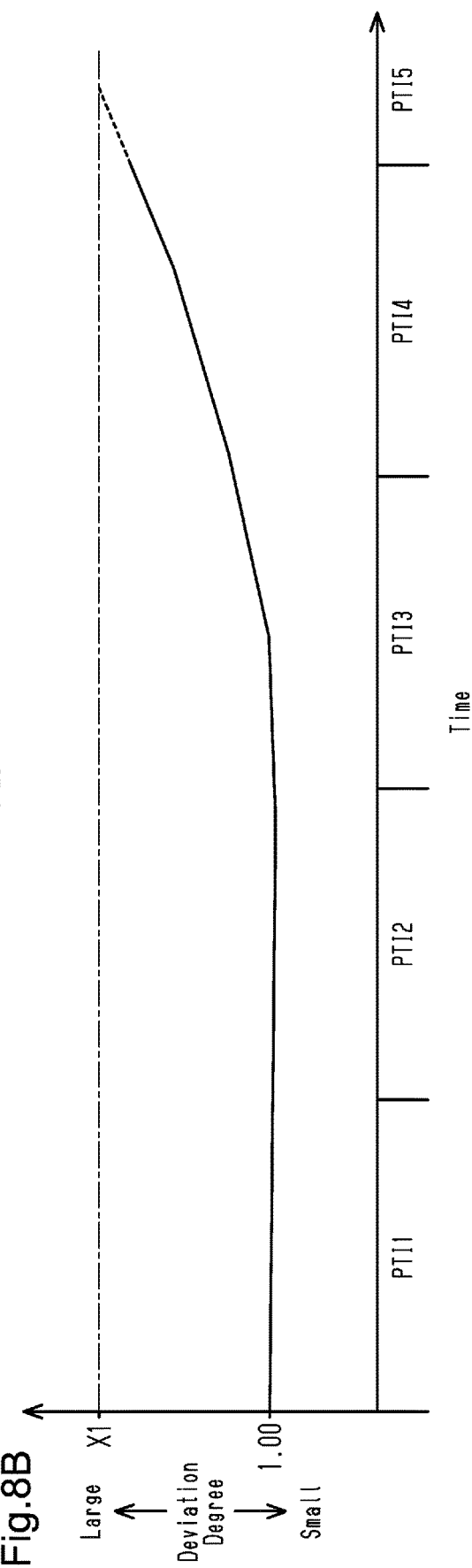
FIG. 8B is a graph showing an example of changes in a deviation degree of a first index value from a second index value.

The calculator 66 calculates, for example, a deviation degree of the first polytropic index from the second polytropic index. In the present embodiment, the deviation degree of the first polytropic index from the second polytropic index is expressed by a ratio of the first polytropic index to the second polytropic index. As the ratio increases, the deviation degree of the first polytropic index from the second polytropic index increases. FIG. 8B is a graph showing an example of changes in the deviation degree of the first polytropic index from the second polytropic index. As shown in FIG. 8B, the deviation degree of the first polytropic index from the second polytropic index is approximately 1.00 until the cooling operation (in range) of the second pre-trip inspection. In the cooling operation (in range) of the third pre-trip inspection, the deviation degree of the first polytropic index from the second polytropic index gradually increases. In the cooling operation (in range) of the fourth pre-trip inspection, the deviation degree increases more steeply.

The deviation degree of the first polytropic index from the second polytropic index may be expressed by a difference between the first polytropic index and the second polytropic index. As the difference increases, the deviation degree of the first polytropic index from the second polytropic index increases. For the remaining test operating modes, that is, the cooling operation (pull-down), the defrosting operation, the refrigerating operation (pull-down), and the refrigerating operation (in range), the calculator 66 calculates the deviation degree of the first polytropic index from the second polytropic index in the same manner as the cooling operation (in range).

When the deviation degree of the first polytropic index from the second polytropic index is greater than or equal to a first threshold value X1, the determination unit 67 determines that the compressor 11 has an abnormality. The first threshold value X1 is set in advance by experiments or the like and is used to determine that the compression efficiency of the compressor 11 is excessively decreased. The first threshold value X1 is set for each test operating mode.

When the compressor 11 has no abnormality, the determination unit 67 estimates an abnormality occurrence time of the compressor 11 based on a change trend of the deviation degree of the first polytropic index from the second polytropic index. In an example, the calculator 66 calculates a deviation degree of the first polytropic index from the second polytropic index of each test operating mode in the most recent pre-trip inspection and outputs the calculated deviation degrees to the determination unit 67. The determination unit 67 obtains a change trend of the deviation degree from the deviation degree of the first polytropic index from the second polytropic index of each test operating mode in the most recent pre-trip inspection. The determination unit 67 estimates a time at which the deviation degree reaches the first threshold value X1 based on the change trend of the deviation degree of the first polytropic index from the second polytropic index in the most recent pre-trip inspection. The determination unit 67 may calculate a slope of the deviation degree using, for example, regression analysis or a straight line that connects deviation degrees of predetermined two periods. In an example, as shown in FIG. 8B, the determination unit 67 estimates a deviation degree of the cooling operation (in range) in the fifth and subsequent pre-trip inspections (indicated by broken line in FIG. 8B) based on changes in the deviation degree of the first polytropic index from the second polytropic index of the cooling operation (in range) in the fourth pre-trip inspection. The determination unit 67 estimates an abnormality occurrence time of the compressor 11 based on a comparison of the first threshold value X1 with changes in the deviation degree of the cooling operation (in range) in the fifth and subsequent pre-trip inspections. In FIG. 8B, it is assumed that the deviation degree will reach the first threshold value X1 in the cooling operation (in range) of the fifth pre-trip inspection.

For the remaining test operating modes, that is, the cooling operation (pull-down), the defrosting operation, the refrigerating operation (pull-down), and the refrigerating operation (in range), the determination unit 67 determines whether the abnormality of the compressor 11 has an abnormality and, when the compressor 11 has no abnormality, estimates an abnormality occurrence time of the compressor 11 in the same manner as the cooling operation (in range).

Figure 9:
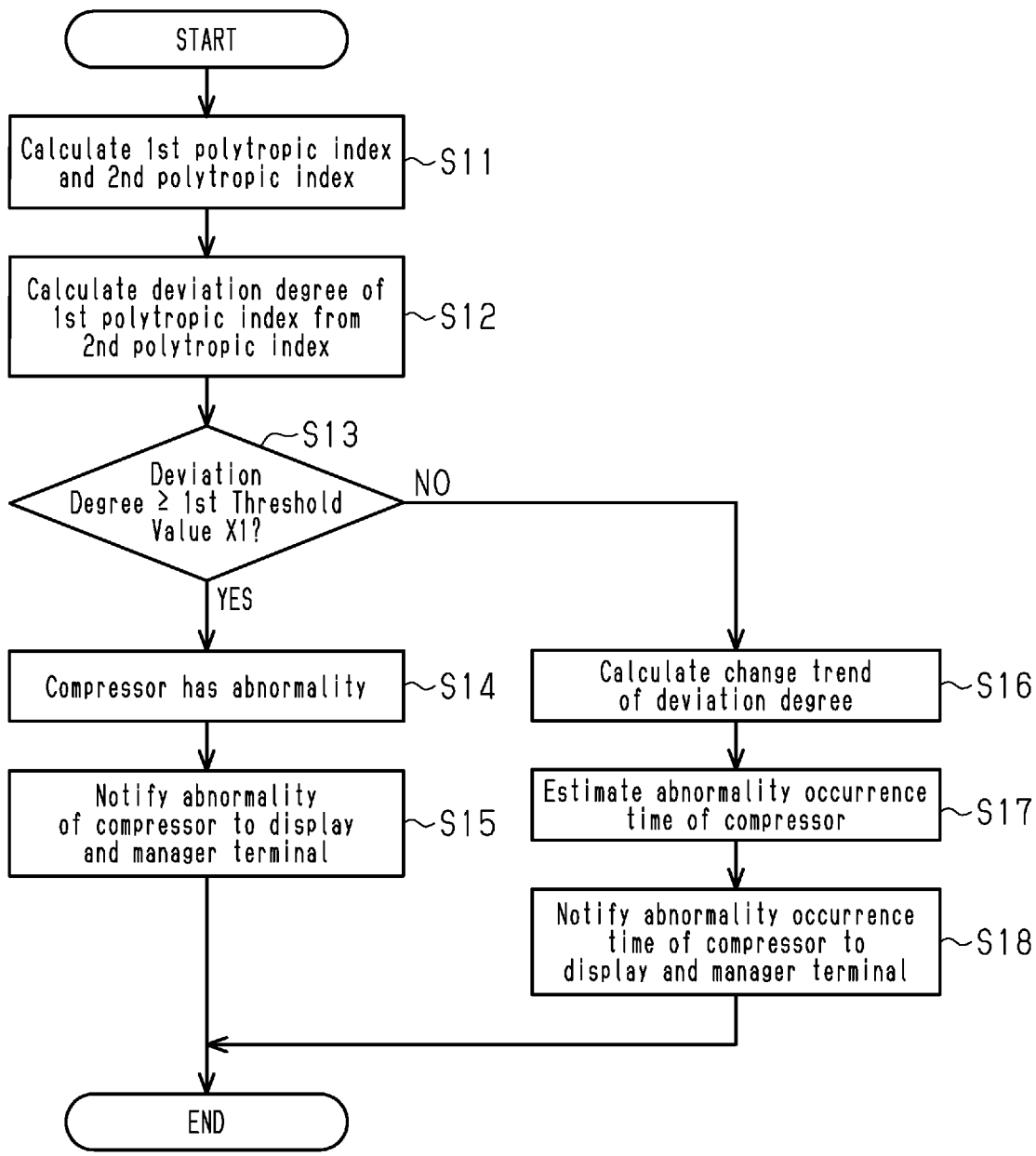
FIG. 9 is a flowchart showing an example of procedures of an abnormality determination process executed by an abnormality determination device.

Procedures of determination of whether the compressor 11 has an abnormality and estimation of an abnormality occurrence time of the compressor 11 performed by the abnormality determination device 60 will be described in detail with reference to FIG. 9. This process is executed, for example, at least one of when there is a user request, when the transporting refrigeration apparatus 1 or the abnormality determination device 60 is powered on, when transportation of the refrigeration apparatus 1 is completed, or when the pre-trip inspection of the refrigeration apparatus 1 is conducted. In the present embodiment, at each of when there is a user request, when the refrigeration apparatus 1 or the abnormality determination device 60 is powered on, when transportation of the refrigeration apparatus 1 is completed, and when the pre-trip inspection of the refrigeration apparatus 1 is conducted, the abnormality determination device 60 determines whether the compressor 11 has an abnormality. Then, when there is no abnormality, the abnormality determination device 60 estimates the abnormality occurrence time of the compressor 11.

In step S11, the abnormality determination device 60 calculates the first polytropic index and the second polytropic index for each test operating mode from time series test data extracted by the pre-processing unit 63 and then proceeds to step S12. In step S12, the abnormality determination device 60 calculates the deviation degree of the first polytropic index from the second polytropic index for each test operating mode and then proceeds to step S13.

In step S13, the abnormality determination device 60 determines whether the deviation degree of the first polytropic index from the second polytropic index for each test operating mode is greater than or equal to the first threshold value X1. In step S13, if the deviation degree of the first polytropic index from the second polytropic index is greater than or equal to the first threshold value X1 in at least one of the test operating modes, the abnormality determination device 60 makes an affirmative determination.

When the affirmative determination is made in step S13, the abnormality determination device 60 proceeds to step S14 to determine that the compressor 11 has an abnormality and then proceeds to step S15. In step S15, the abnormality determination device 60 transmits the determination result to at least one of the display 53 or the manager terminal 70 and then temporarily ends the process. The display 53 and the manager terminal 70 issue notification of the determination result of whether the compressor 11 has an abnormality in step S15 at least one of when there is a user request, when the refrigeration apparatus 1 or the abnormality determination device 60 is powered on, when transportation of the refrigeration apparatus 1 is completed, or when the pre-trip inspection of the refrigeration apparatus 1 is conducted. In the present embodiment, the display 53 and the manager terminal 70 issue notification of the determination result of whether the compressor 11 has an abnormality each of when there is a user request, when the refrigeration apparatus 1 or the abnormality determination device 60 is powered on, when transportation of the refrigeration apparatus 1 is completed, and when the pre-trip inspection of the refrigeration apparatus 1 is conducted.

When a negative determination is made in step S13, the abnormality determination device 60 proceeds to step S16 to calculate a change trend of the deviation degree of the first polytropic index from the second polytropic index for each test operating mode and then proceeds to step S17.

In step S17, the abnormality determination device 60 estimates an abnormality occurrence time of the compressor 11 based on the change trend of the deviation degree of the first polytropic index from the second polytropic index and then proceeds to step S18. The abnormality determination device 60 estimates the abnormality occurrence time of the compressor 11 for each test operating mode. In step S18, the abnormality determination device 60 transmits the estimation result to at least one of the display 53 or the manager terminal 70 and then temporarily ends the process. In this step, the abnormality determination device 60 transmits the earliest one of the abnormality occurrence times of the compressor 11 estimated for each test operating mode to at least one of the display 53 or the manager terminal 70 as the estimation result. The display 53 and the manager terminal 70 issue notification of the estimation result of the abnormality occurrence time of the compressor 11 in step S18 at least one of when there is a user request, when the refrigeration apparatus 1 or the abnormality determination device 60 is powered on, when transportation of the refrigeration apparatus 1 is completed, or when the pre-trip inspection of the refrigeration apparatus 1 is conducted. In the present embodiment, the display 53 and the manager terminal 70 issue notification of the estimation result of the abnormality occurrence time of the compressor 11 each of when there is a user request, when the refrigeration apparatus 1 or the abnormality determination device 60 is powered on, when transportation of the refrigeration apparatus 1 is completed, and when the pre-trip inspection of the refrigeration apparatus 1 is conducted.

In steps S15 and S18, the results may be transmitted to the notification unit 52 instead of the display 53. When the notification unit 52 includes a speaker, the notification unit 52 may issue notification of the determination result of whether the compressor 11 has an abnormality with the speaker, and when there is no abnormality, may issue notification of the estimation result of an abnormality occurrence time of the compressor 11.

The second example of the first index value and the second index value will now be described.

The calculator 66 calculates an estimation value of current supplied to the compressor 11 and an actual value of current supplied to the compressor 11 and calculates the compressor current ratio as the ratio of the actual value of current supplied to the compressor 11 to the estimation value of current supplied to the compressor 11.

The calculator 66 calculates the estimation value of current supplied to the compressor 11 from, for example, at least one of the condensation temperature of the refrigerant circuit 20, the evaporation temperature, the operating frequency of the compressor 11, or the rotational speed of the compressor 11.

The calculator 66 calculates the actual value of current supplied to the compressor 11 in the compressor current ratio from a signal of the current sensor 45. The actual value of current supplied to the compressor 11 increases relative to the estimation value of current supplied to the compressor 11, for example, when the amount of the refrigerant leaked from the high-pressure side to the low-pressure side in the compression mechanism of the compressor 11 is increased due to deterioration of the compressor 11 or when the rotation resistance of the rotor of the motor in the compressor 11 is increased due to deterioration of the bearing (rolling bearing) that rotationally supports the rotor. Thus, the deviation degree of the actual value of current supplied to the compressor 11 from the estimation value of current supplied to the compressor 11 is correlated with the deterioration degree of the compressor 11.

Figure 10B:
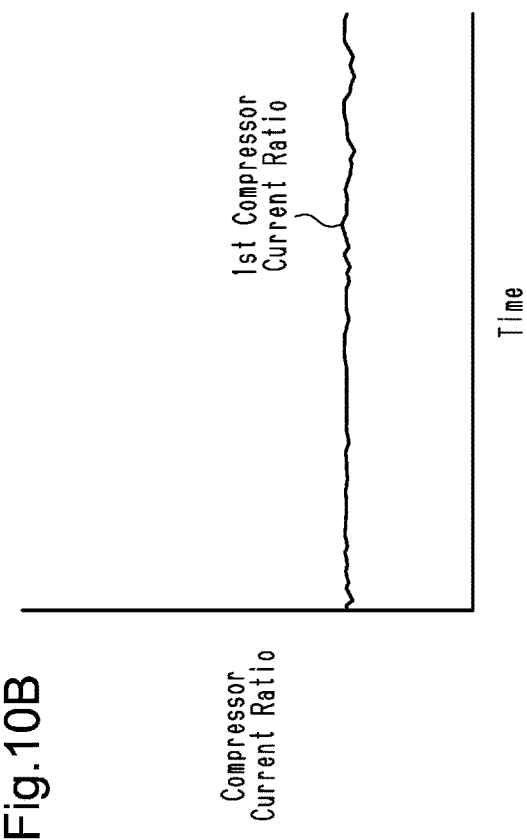
FIGS. 10A, 10B, 10C, and 10D are graphs showing examples of changes in a compressor current ratio of each pre-trip inspection.
Figure 10D:
Figure 10A:
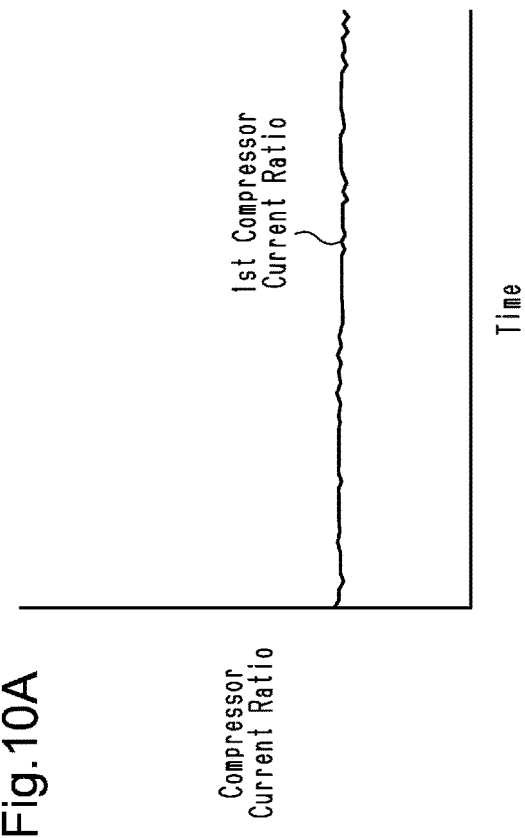
Figure 10C:
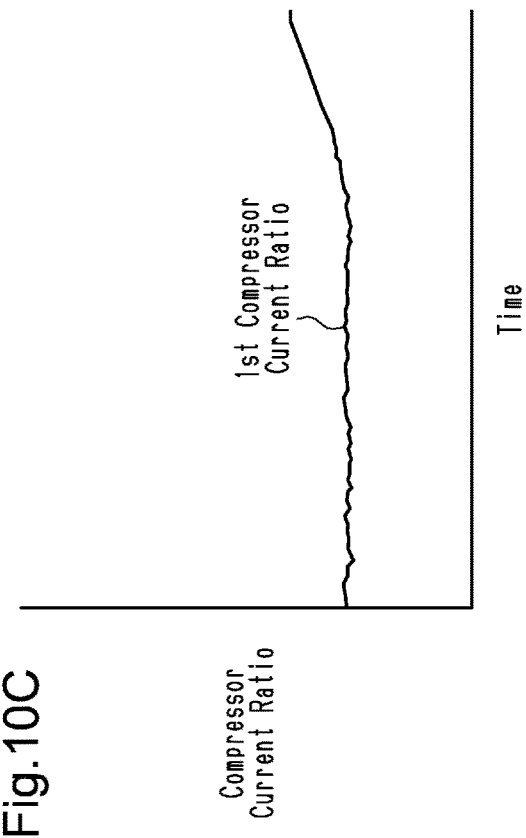
Figure 11A:
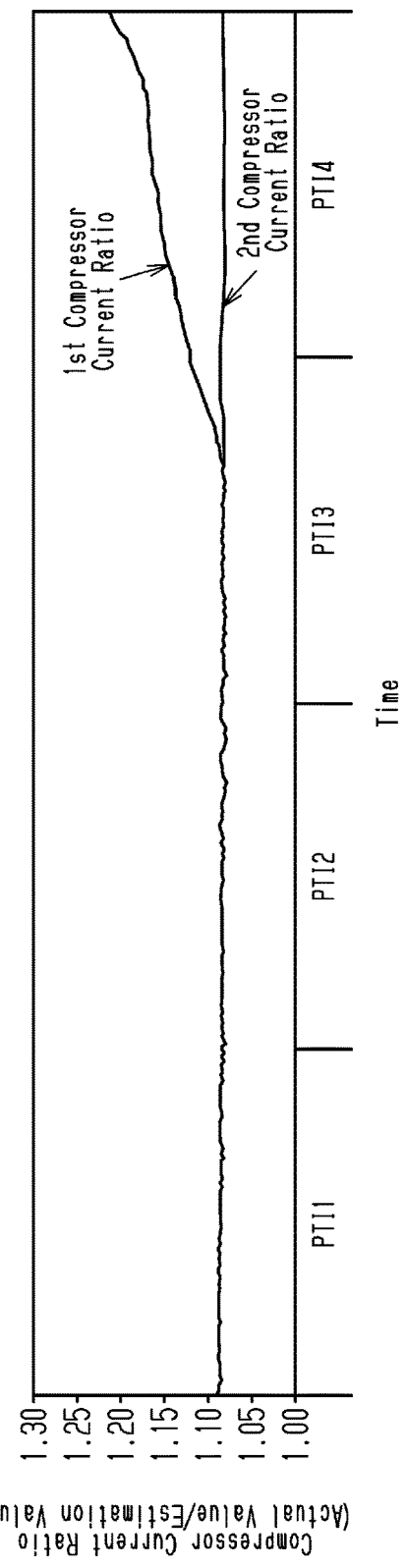
FIG. 11A is a graph showing an example of changes in a compressor current ratio of the refrigeration apparatus obtained by joining FIGS. 10A to 10D in time order.

The calculator 66 calculates a compressor current ratio in the first period (hereafter, referred to as "first compressor current ratio") as the first index value and calculates a compressor current ratio in the second period (hereafter, referred to as "second compressor current ratio") as the second index value. FIG. 10A shows an example of changes in the first compressor current ratio calculated from results of the cooling operation (in range) of the first pre-trip inspection after the refrigeration apparatus 1 is installed on the container. FIG. 10B shows changes in the first compressor current ratio calculated from results of the cooling operation (in range) of the second pre-trip inspection. FIG. 10C shows changes in the first compressor current ratio calculated from results of the cooling operation (in range) of the third pre-trip inspection. FIG. 10D shows changes in the first compressor current ratio calculated from results of the cooling operation (in range) of the fourth pre-trip inspection. FIG. 11A is a graph that joins the test data of FIGS. 10A to 10D in time order. The graph shown in FIG. 11A shows changes in the first compressor current ratio and the second compressor current ratio. As shown in FIG. 11A, the first compressor current ratio is equal to the second compressor current ratio up to the cooling operation (in range) of the second pre-trip inspection. However, in the cooling operation (in range) of the third pre-trip inspection, the deviation degree of the first compressor current ratio from the second compressor current ratio gradually increases. In the cooling operation (in range) of the fourth pre-trip inspection, the deviation degree increases as time elapses.

Figure 11B:
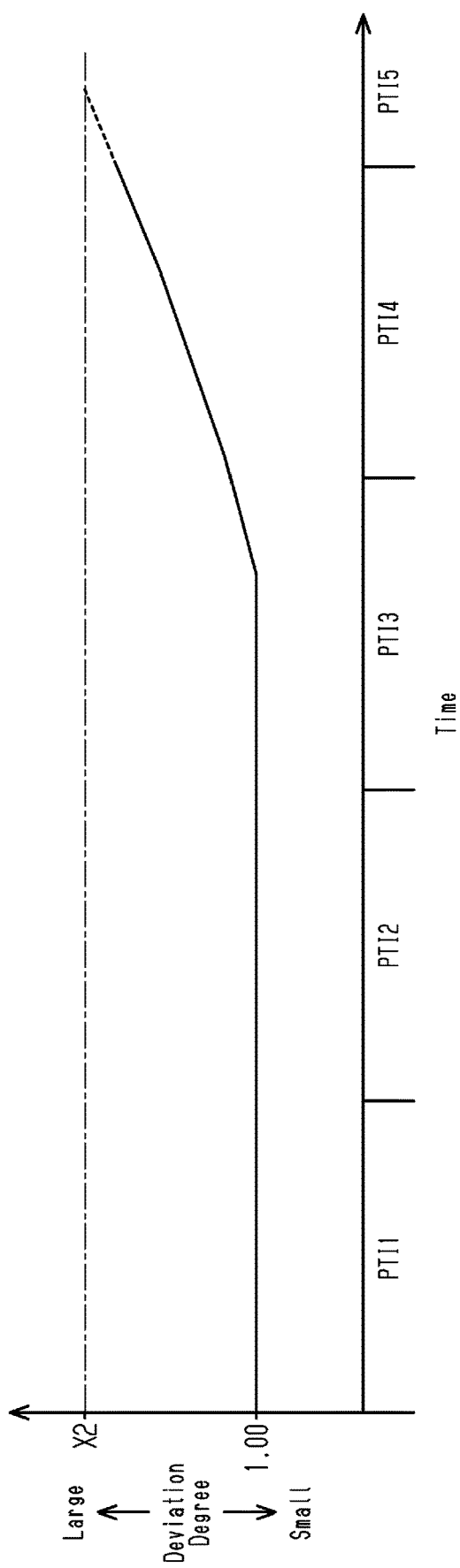
FIG. 11B is a graph showing an example of changes in a deviation degree of a first index value from a second index value.

The calculator 66 calculates, for example, the deviation degree of the first compressor current ratio from the second compressor current ratio. In the present embodiment, the deviation degree of the first compressor current ratio from the second compressor current ratio is expressed by a ratio of the first compressor current ratio to the second compressor current ratio. As the ratio increases, the deviation degree of the first compressor current ratio from the second compressor current ratio increases. FIG. 11B is a graph showing an example of changes in the deviation degree of the first compressor current ratio to the second compressor current ratio in the cooling operation (in range). As shown in FIG. 11B, the deviation degree of the first compressor current ratio to the second compressor current ratio is approximately 1.00 until the cooling operation (in range) of the second pre-trip inspection. In the cooling operation (in range) of the third pre-trip inspection, the deviation degree of the first compressor current ratio from the second compressor current ratio gradually increases. In the cooling operation (in range) of the fourth pre-trip inspection, the deviation degree increases more steeply.

The deviation degree of the first compressor current ratio from the second compressor current ratio may be expressed by a difference between the first compressor current ratio and the second compressor current ratio. As the difference increases, the deviation degree of the first compressor current from the second compressor current ratio increases. For the remaining test operating modes, that is, the cooling operation (pull-down), the defrosting operation, the refrigerating operation (pull-down), and the refrigerating operation (in range), the calculator 66 calculates the deviation degree of the first compressor current ratio from the second compressor current ratio in the same manner as the cooling operation (in range).

When the deviation degree of the first compressor current ratio from the second compressor current ratio is greater than or equal to a second threshold value X2, the determination unit 67 determines that the compressor 11 has an abnormality. The second threshold value X2 is set in advance by experiments or the like and is used to determine that the compressor 11 has an abnormality due to deterioration of the compressor 11.

The determination unit 67 estimates an abnormality occurrence time of the compressor 11 based on a change trend of the deviation degree of the first compressor current ratio from the second compressor current ratio. More specifically, the calculator 66 calculates a deviation degree of the first compressor current ratio from the second compressor current ratio for each test operating mode, for example, in the most recent pre-trip inspection and outputs the calculated deviation degrees to the determination unit 67. The determination unit 67 obtains a change trend of the deviation degree from the deviation degree of the first compressor current ratio from the second compressor current ratio for each test operating mode, for example, in the most recent pre-trip inspection. In an example, as shown in FIG. 11B, the determination unit 67 estimates a deviation degree of the cooling operation (in range) in the fifth and subsequent pre-trip inspections (indicated by the broken line in FIG. 11B) based on changes in the deviation degree of the first compressor current ratio from the second compressor current ratio in the cooling operation (in range) of the fourth pre-trip inspection. The determination unit 67 estimates an abnormality occurrence time of the compressor 11 based on a comparison of the second threshold value X2 with changes in the deviation degree of the first compressor current ratio from the second compressor current ratio of the cooling operation (in range) in the fifth or later pre-trip inspections. In FIG. 11B, it is assumed that the deviation degree will reach the second threshold value X2 in the cooling operation (in range) of the fifth pre-trip inspection.

For the remaining test operating modes, that is, the cooling operation (pull-down), the defrosting operation, the refrigerating operation (pull-down), and the refrigerating operation (in range), the determination unit 67 determines whether the abnormality of the compressor 11 has an abnormality and, when the compressor 11 has no abnormality, estimates an abnormality occurrence time of the compressor 11 in the same manner as the cooling operation (in range).

Figure 12:
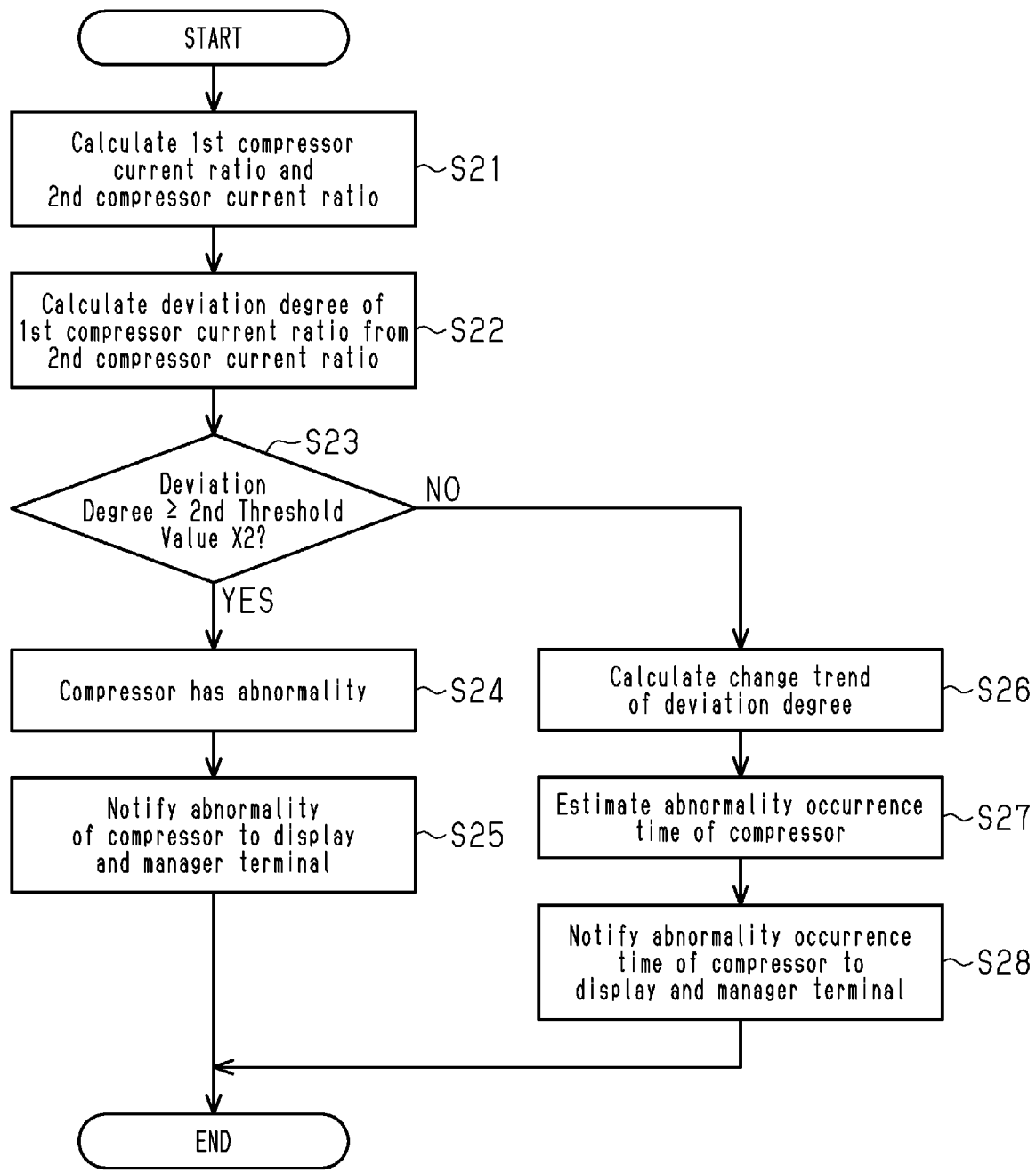
FIG. 12 is a flowchart showing another example of procedures of an abnormality determination process executed by an abnormality determination device.

Procedures of determination of whether the compressor 11 has an abnormality and estimation of an abnormality occurrence time of the compressor 11 performed by the abnormality determination device 60 will be described in detail with reference to FIG. 12. This process is executed, for example, at least one of when there is a user request, when the transporting refrigeration apparatus 1 or the abnormality determination device 60 is powered on, when transportation of the refrigeration apparatus 1 is completed, or when the pre-trip inspection of the refrigeration apparatus 1 is conducted. In the present embodiment, at each of when there is a user request, when the refrigeration apparatus 1 or the abnormality determination device 60 is powered on, when transportation of the refrigeration apparatus 1 is completed, and when the pre-trip inspection of the refrigeration apparatus 1 is conducted, the abnormality determination device 60 determines whether the compressor 11 has an abnormality. Then, when there is no abnormality, the abnormality determination device 60 estimates the abnormality occurrence time of the compressor 11.

In step S21, the abnormality determination device 60 calculates the first compressor current ratio and the second compressor current ratio for each test operating mode from time series test data extracted by the pre-processing unit 63 and then proceeds to step S22. In step S22, the abnormality determination device 60 calculates the deviation degree of the first compressor current ratio from the second compressor current ratio for each test operating mode and then proceeds to step S23.

In step S23, the abnormality determination device 60 determines whether the deviation degree of the first compressor current ratio from the second compressor current ratio for each test operating mode is greater than or equal to the second threshold value X2. In step S23, if the deviation degree of the first compressor current ratio from the second compressor current ratio is greater than or equal to the second threshold value X2 in at least one of the test operating modes, the abnormality determination device 60 makes an affirmative determination.

When the affirmative determination is made in step S23, the abnormality determination device 60 proceeds to step S24 to determine that the compressor 11 has an abnormality and then proceeds to step S25. In step S25, the abnormality determination device 60 transmits the determination result to at least one of the display 53 or the manager terminal 70 and then temporarily ends the process. The display 53 and the manager terminal 70 issue notification of the determination result of whether the compressor 11 has an abnormality in step S25 at least one of when there is a user request, when the refrigeration apparatus 1 or the abnormality determination device 60 is powered on, when transportation of the refrigeration apparatus 1 is completed, or when the pre-trip inspection of the refrigeration apparatus 1 is conducted. In the present embodiment, the display 53 and the manager terminal 70 issue notification of the determination result of whether the compressor 11 has an abnormality each of when there is a user request, when the refrigeration apparatus 1 or the abnormality determination device 60 is powered on, when transportation of the refrigeration apparatus 1 is completed, and when the pre-trip inspection of the refrigeration apparatus 1 is conducted.

When a negative determination is made in step S23, the abnormality determination device 60 proceeds to step S26 to calculate a change trend of the deviation degree of the first compressor current ratio from the second compressor current ratio for each test operating mode and then proceeds to step S27.

In step S27, the abnormality determination device 60 estimates the abnormality occurrence time of the compressor 11 based on a slope of the deviation degree of the first compressor current ratio from the second compressor current ratio and then proceeds to step S28. The abnormality determination device 60 estimates an abnormality occurrence time of the compressor 11 for each test operating mode. In step S28, the abnormality determination device 60 transmits the estimation result to at least one of the display 53 or the manager terminal 70 and then temporarily ends the process. In this step, the abnormality determination device 60 transmits the earliest one of the abnormality occurrence times of the compressor 11 estimated for each test operating mode to at least one of the display 53 or the manager terminal 70 as the estimation result. The display 53 and the manager terminal 70 issue notification of the estimation result of the abnormality occurrence time of the compressor 11 in step S28 at least one of when there is a user request, when the refrigeration apparatus 1 or the abnormality determination device 60 is powered on, when transportation of the refrigeration apparatus 1 is completed, or when the pre-trip inspection of the refrigeration apparatus 1 is conducted. In the present embodiment, the display 53 and the manager terminal 70 issue notification of the estimation result of the abnormality occurrence time of the compressor 11 each of when there is a user request, when the refrigeration apparatus 1 or the abnormality determination device 60 is powered on, when transportation of the refrigeration apparatus 1 is completed, and when the pre-trip inspection of the refrigeration apparatus 1 is conducted.

In steps S25 and S28, the results may be transmitted to the notification unit 52 instead of the display 53. When the notification unit 52 includes a speaker, the notification unit 52 may issue a notification of the determination result of whether the compressor 11 has an abnormality and a notification of the estimation result of an abnormality occurrence time of the compressor 11 with the speaker.

The method for determining whether the refrigeration apparatus 1 has an abnormality executed by the abnormality determination device 60 as described above includes a data storing step, an extracting step, a first calculating step, a second calculating step, and a determining step. The steps will be described below.

The data storing step is a step of storing data related to operation of the refrigeration apparatus 1. In an example, in the data storing step, data related to operation of the refrigeration apparatus 1 and obtained from the data obtainment unit 61 is stored in the data storage 62 as time series data.

The extracting step is a step of extracting time series test data related to a same one of the test operating modes from time series data when the pre-trip inspection is conducted multiple times. In the extracting step, for all of the test operating modes of all of the pre-trip inspections conducted from when the refrigeration apparatus 1 is installed on a container to the present time, time series test data of each test operating mode is extracted. The extracting step further includes a pre-processing step that removes test data that acts as noise when determining whether the compressor 11 has an abnormality and estimating an abnormality occurrence time of the compressor 11 with the pre-processing unit 63 and replaces it with alternative data.

The first calculating step is a step of calculating the first index value of each test operating mode from time series test data obtained in the first period and calculating the second index value of each test operating mode from time series test data obtained in the second period. The first calculating step is executed by the calculator 66 to calculate the first index value using a moving average of the time series test data obtained in the first period and calculate the second index value using a moving average of the time series test data obtained in the second period. The relationship of the first calculating step with FIGS. 9 and 12 is that step S11 in FIG. 9 and step S21 in FIG. 12 correspond to the first calculating step.

The second calculating step is a step of calculating a deviation degree of the compressor 11 from the normal state based on the first index value and the second index value of each test operating mode. The second calculating step is executed by the calculator 66. The relationship of the second calculating step with FIGS. 9 and 12 is that step S12 in FIG. 9 and step S22 in FIG. 12 correspond to the second calculating step.

The determining step is a step of determining whether the compressor 11 has an abnormality based on the deviation degree of the compressor 11 from the normal state for each test operating mode, and when there is no abnormality, estimating an abnormality occurrence time of the compressor 11. In the determining step, when the second index value refers to the normal state of the compressor 11 and the deviation degree of the first index value from the second index value is greater than or equal to a threshold value, it is determined that the compressor 11 has an abnormality. In the determining step, a time at which the deviation degree reaches the threshold value is estimated based on a change trend of the deviation degree of the first index value from the second index value, so that the abnormality occurrence time of the compressor 11 is estimated. The relationship of the determining step with FIGS. 9 and 12 is that steps S13 to S18 in FIG. 9 and steps S23 to S28 in FIG. 12 correspond to the determining step.

The operation of the present embodiment will now be described.

The operation state of the refrigeration apparatus 1 differs, for example, in accordance with the storage set temperature, cargo loaded in the storage, and the operating mode such as the cooling operation, the refrigerating operation, or the defrosting operation. Therefore, data related to operation of the refrigeration apparatus 1 varies depending on the operation state of the refrigeration apparatus 1. Use of data having variations in the operation state of the refrigeration apparatus 1 for determining whether the compressor 11 has an abnormality and estimating the abnormality occurrence time of the compressor 11 may lower the accuracy of the determination and the estimation.

In this regard, in the present embodiment, after the refrigeration apparatus 1 is installed on a container, the pre-trip inspection is conducted multiple times, and the abnormality determination device 60 extracts time series data of each test operating mode. Then, the abnormality determination device 60 determines whether the compressor 11 has an abnormality for each test operating mode, and when there is no abnormality, estimates an abnormality occurrence time of the compressor 11. In the pre-trip inspection, while no cargo is loaded in the storage, test data is extracted in each test operating mode. When test data are joined in time order, the consecutive test data correspond to operation of the refrigeration apparatus 1 performed under the same condition. Thus, variations in the operation state of the refrigeration apparatus 1 are limited. This limits the lowering of the accuracy of determination of whether the compressor 11 has an abnormality and the accuracy of estimation of an abnormality occurrence time of the compressor 11.

In addition, the abnormality determination device 60 calculates the second index value from time series test data obtained in the second period using a moving average and uses the calculated second index value as reference. In the present embodiment, the second period corresponds to time series test data obtained in a long period and thus is subtly affected by variations related to operation of the refrigeration apparatus 1 in the test operating modes of the pre-trip inspection conducted for a short period.

In addition, the abnormality determination device 60 calculates the first index value from time series data obtained in the first period using a moving average. In the present embodiment, the time series test data obtained in the first period correspond to time series data obtained in a short period and thus is greatly affected by recent variations related to operation of the refrigeration apparatus 1 in test operating modes of the pre-trip inspection.

As described above, the second index value, which is subtly affected by recent variations related to test operations of the refrigeration apparatus 1, is used as a reference to monitor how much the first index value, which is greatly affected by variations related to test operations of the refrigeration apparatus 1, is deviated from the second index value. This facilitates extraction of variations related to operation of the refrigeration apparatus 1 in the test operating modes of the pre-trip inspection. With this configuration, when the compressor 11 has an abnormality, the first index value is prominently deviated from the second index value so that the abnormality determination device 60 determines that the compressor 11 has an abnormality. In addition, the abnormality determination device 60 obtains a change trend of the deviation degree of the first index value from the second index value and estimates changes in the deviation degree to estimate an abnormality occurrence time of the compressor 11.

The advantages of the present embodiment will now be described.

(1-1) The determination unit 67 determines whether the refrigeration apparatus 1 has an abnormality based on a change trend in time series test data related to each of the test operating modes when the pre-trip inspection is conducted multiple times. Then, when there is no abnormality, the determination unit 67 estimates an abnormality occurrence time. With this configuration, the pre-trip inspection is conducted multiple times, and whether the refrigeration apparatus 1 has an abnormality is determined for each of the test operating modes. When there is no abnormality, the abnormality occurrence time is estimated. Thus, whether the refrigeration apparatus 1 has an abnormality is determined with high accuracy. When there is no abnormality, the abnormality occurrence time is estimated with high accuracy.

(1-2) The determination unit 67 determines whether the refrigeration apparatus 1 has an abnormality based on temporal changes in time series test data related to the same one of the test operating modes when the pre-trip inspection is consecutively conducted multiple times. Then, when there is no abnormality, the determination unit 67 estimates an abnormality occurrence time. With this configuration, time series test data obtained from consecutive pre-trip inspections are used to obtain a continuous change trend of the test data. In addition, whether the refrigeration apparatus 1 has an abnormality is determined for each of the test operating modes. When there is no abnormality, the abnormality occurrence time is estimated. Thus, whether the refrigeration apparatus 1 has an abnormality is determined with high accuracy. When there is no abnormality, the abnormality occurrence time is estimated with high accuracy.

(1-3) The calculator 66 calculates the deviation state of the refrigeration apparatus 1 from the normal state based on the first index value and the second index value. The first index value is calculated from time series test data obtained in the first period and extracted by the pre-processing unit 63. The second index value is calculated from time series data obtained in the second period that differs in length from the first period. The determination unit 67 determines whether the refrigeration apparatus 1 has an abnormality based on the deviation degree of the refrigeration apparatus 1 from the normal state and, when there is no abnormality, estimates an abnormality occurrence time. With this configuration, the deviation state of the refrigeration apparatus 1 from the normal state is calculated based on the deviation degree between the first index value and the second index value that are calculated using time series test data of the test operating mode used in the pre-trip inspection of the refrigeration apparatus 1. This allows the determination unit 67 to determine whether the refrigeration apparatus 1 has an abnormality based on the deviation state of the refrigeration apparatus 1 from the normal state and to estimate an abnormality occurrence time when there is no abnormality. Thus, whether the refrigeration apparatus 1 has an abnormality is determined without a special operation for determining whether the refrigeration apparatus 1 has an abnormality. Then, when there is no abnormality, an abnormality occurrence time is estimated.

(1-4) The second index value, which is calculated from the long second period, is subtly affected by variations in operation of the refrigeration apparatus 1 in the test operating modes of the pre-trip inspection. The first index value, which is calculated from the short first period, is greatly affected by variations in operation of the refrigeration apparatus 1 in the test operating modes of the pre-trip inspection. In the present embodiment, the calculator 66 calculates the deviation degree of the refrigeration apparatus 1 from the normal state based on the deviation degree between the first index value and the second index value. Thus, variations in operation of the refrigeration apparatus 1 in the test operating modes of the pre-trip inspection are readily extracted, so that whether the refrigeration apparatus 1 has an abnormality is determined based on the variations in operation of the refrigeration apparatus 1 in the test operating modes of the pre-trip inspection. Then, when there is no abnormality, an abnormality occurrence time is estimated.

(1-5) The first index value is calculated by a moving average of time series test data obtained in the first period. The second index value is calculated by a moving average of time series data obtained in the second period. With this configuration, whether the refrigeration apparatus 1 has an abnormality is determined based on the deviation degree between variations in operation of the refrigeration apparatus 1 in the test operating modes of the pre-trip inspection conducted for a long period and variations in operation of the refrigeration apparatus 1 in the test operating modes of the pre-trip inspection conducted for a short period. Then, when there is no abnormality, an abnormality occurrence time is estimated.

(1-6) The pre-processing unit 63 eliminates test data that acts as noise when determining whether the refrigeration apparatus 1 has an abnormality and estimating an abnormality occurrence time of the refrigeration apparatus 1, and replaces it with alternative data. As a result, the determination of whether the refrigeration apparatus 1 has an abnormality and the estimation of an abnormality occurrence time of the refrigeration apparatus 1 are performed with high accuracy.

(1-7) When the first processor 63a extracts a section immediately after activation of the compressor 11, the second processor 63b uses a value after the section immediately after activation of the compressor 11 as the alternative data. This configuration uses data temporally close to the section extracted by the first processor 63a as alternative data, so that the deviation degree of the alternative data from the actual operation data of the refrigeration apparatus 1 is decreased. As a result, the determination of whether the refrigeration apparatus 1 has an abnormality and the estimation of an abnormality occurrence time of the refrigeration apparatus 1 are performed with high accuracy.

(1-8) The notification unit 52 indicates occurrence of an abnormality of the refrigeration apparatus 1 and an abnormality occurrence time of the refrigeration apparatus 1 in the display 53 of the refrigeration apparatus 1 or the manager terminal 70. This allows the manager or the operator of the refrigeration apparatus 1 to recognize the abnormality of the refrigeration apparatus 1 and the abnormality occurrence time.

(1-9) The first index value and the second index value include a polytropic index. This allows for determination of whether the compressor 11 has an abnormality and estimation of an abnormality occurrence time of the compressor 11 based on variations related to the compression process of the compressor 11.

(1-10) The first index value and the second index value include the compressor current ratio. This allows for determination of whether the compressor 11 has an abnormality due to aging and deterioration of the compressor 11 such as deterioration of a bearing of the compressor 11 and for estimation of an abnormality occurrence time of the compressor 11.

Second Embodiment

Figure 14A:
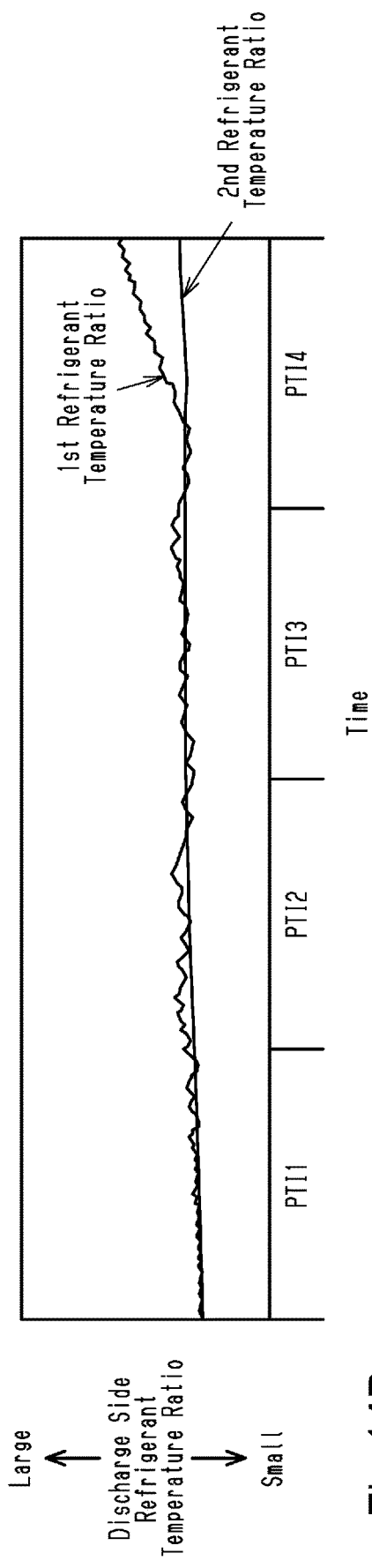
FIG. 14A is a graph showing an example of changes in a discharge side refrigerant temperature ratio of the compressor obtained by joining FIGS. 13A to 13D in time order.
Figure 14B:
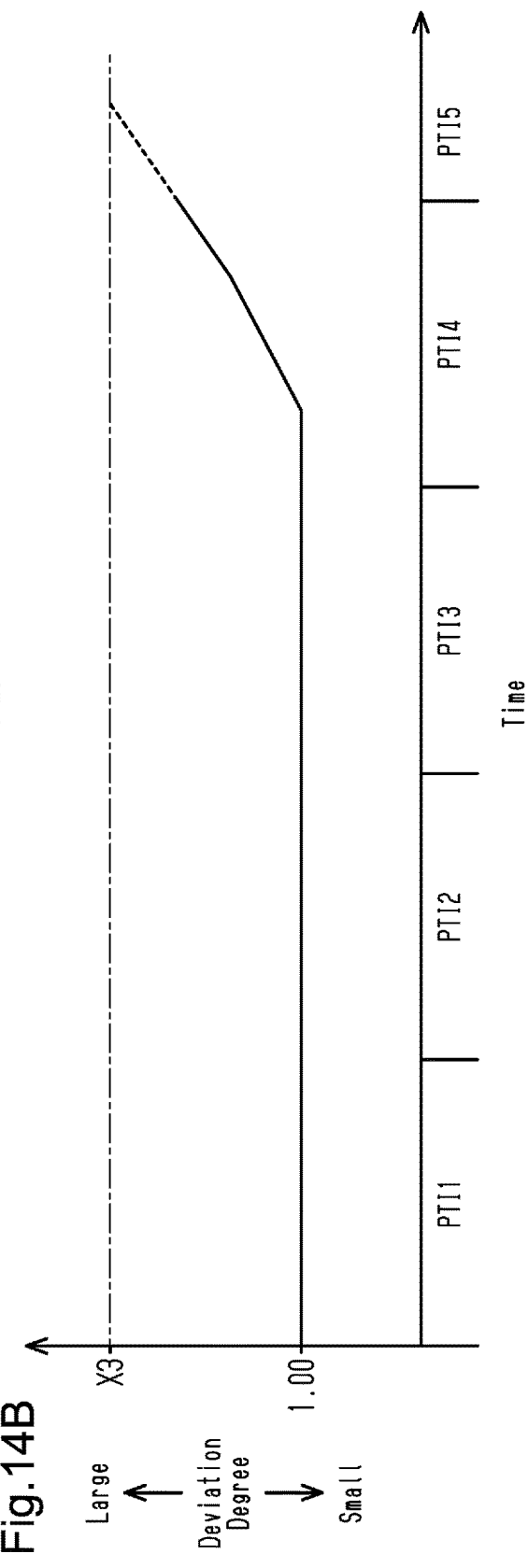
FIG. 14B is a graph showing an example of changes in deviation degree of a first index value from a second index value.
Figure 15:
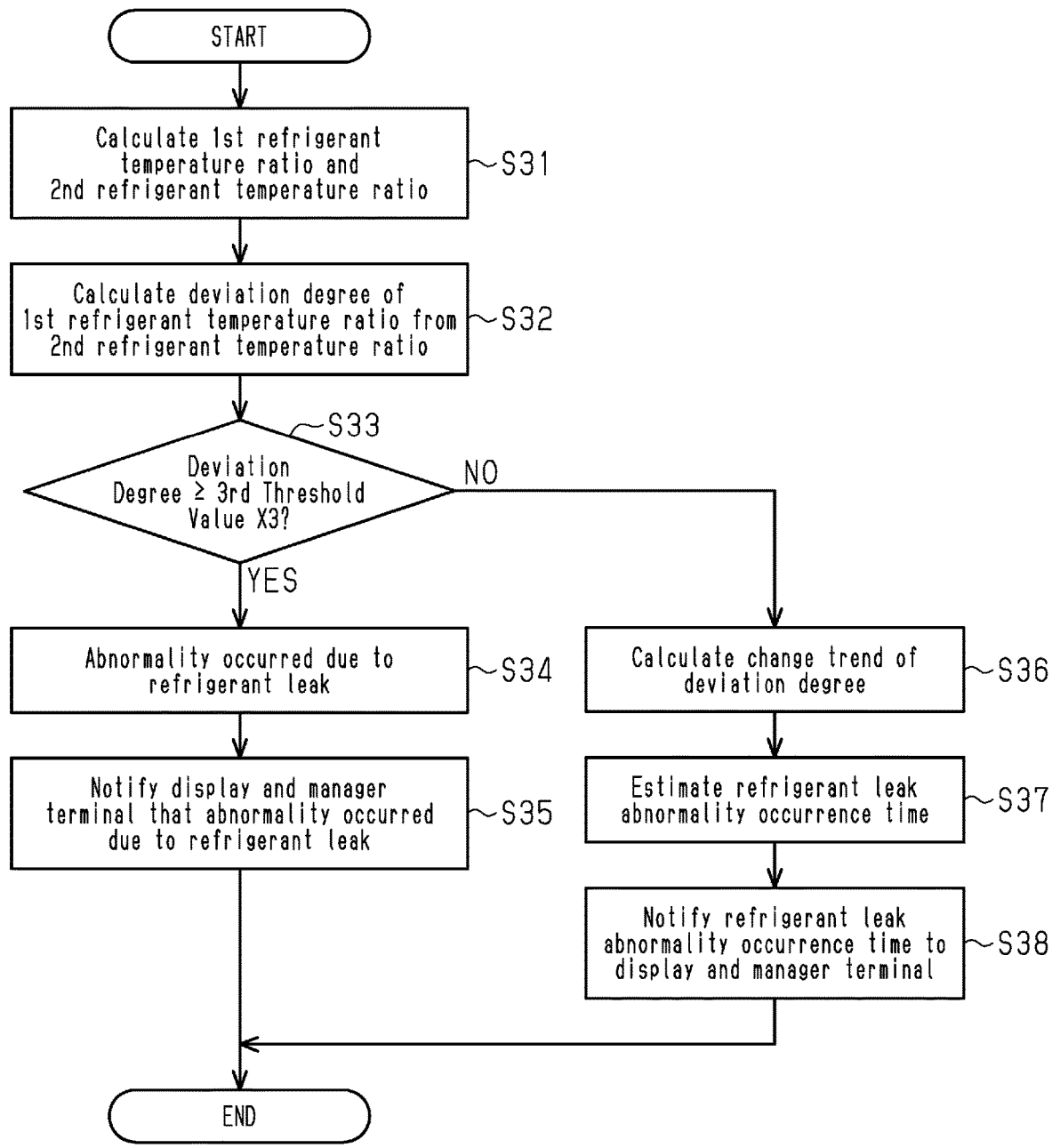
FIG. 15 is a flowchart showing another example of procedures of an abnormality determination process executed by an abnormality determination device.

A second embodiment of the refrigeration apparatus 1 will be described with reference to FIGS. 13 to 15. The present embodiment differs from the first embodiment in that the abnormality determination device 60 determines whether the refrigeration apparatus 1 has an abnormality based on a temperature of a discharge gas refrigerant discharged from the compressor 11 (hereafter, referred to as "discharge side refrigerant temperature of the compressor 11"), and when there is no abnormality, estimates an abnormality occurrence time. Components of the refrigeration apparatus 1 are referred to for the components of the first embodiment. The refrigeration apparatus 1 of the present embodiment is not shown in the drawings.

In the present embodiment, the abnormality determination unit 64 determines a refrigerant leak of the refrigerant circuit 20 as an abnormality of the refrigeration apparatus 1. More specifically, the abnormality determination unit 64 determines whether the refrigerant circuit 20 has a refrigerant leak abnormality as an abnormality of the refrigeration apparatus 1, and when there is no refrigerant leak abnormality, estimates a refrigerant leak abnormality occurrence time.

The refrigerant leak abnormality includes, for example, a decrease in the compression efficiency of the compressor 11 due to an insufficient amount of the refrigerant. The abnormality determination device 60 monitors the discharge side refrigerant temperature of the compressor 11 to determine whether there is a refrigerant leak abnormality, and when there is no refrigerant leak abnormality, estimates a refrigerant leak abnormality occurrence time.

The calculator 66 calculates the first index value and the second index value of each test operating mode of the pre-trip inspection from time series test data stored in each storage region of the storage unit 63c of the pre-processing unit 63 to calculate a deviation degree of the refrigerant circuit 20 from a normal state. The normal state of the refrigerant circuit 20 is, for example, that the amount of refrigerant enclosed in the refrigerant circuit 20 (refrigerant contained amount) is in an appropriate range. The calculator 66 calculates a first index value of each test operating mode from time series test data obtained in a first period. The calculator 66 also calculates a second index value of each test operating mode from time series test data obtained in a second period that differs in length from the first period. The calculator 66 calculates the deviation degree of the refrigerant circuit 20 from the normal state for each test operating mode based on the first index value and the second index value. In the present embodiment, the calculator 66 calculates the deviation degree of the refrigerant circuit 20 from the normal state for each test operating mode based on a deviation degree of the first index value from the second index value. The calculator 66 transmits the calculation result to the determination unit 67.

The determination unit 67 determines whether there is a refrigerant leak abnormality for each test operating mode based on the deviation degree of the refrigerant circuit 20 from the normal state calculated by the calculator 66, and when there is no refrigerant leak abnormality, estimates a refrigerant leak abnormality occurrence time. The determination unit 67 outputs the determination result or the estimation result to the output unit 65.

Determination of whether there is a refrigerant leak abnormality is made based on the refrigerant leak amount per unit time being greater than or equal to a first threshold value and not based on if there has been a small amount of refrigerant leak. In an example, the first threshold value is determined in advance by experiments or the like and is an amount of refrigerant leak that causes the refrigeration apparatus 1 to have an abnormality. An example of the abnormality of the refrigeration apparatus 1 is an excessive increase in the temperature of the compressor 11 that occurs when the refrigerant contained amount is less than a lower limit value of the appropriate range and results in a failure to cool the compressor 11. The refrigerant leak abnormality occurrence time may be, for example, a time at which the refrigerant contained amount becomes less than the lower limit value of the appropriate range or a time at which the temperature of the compressor 11 becomes greater than or equal to a second threshold value due to the refrigerant contained amount becoming less than the lower limit value of the appropriate range and resulting in a failure to cool the compressor 11. An example of the second threshold value is determined in advance by experiments or the like and is a temperature that increases the possibility of producing an abnormality such as galling of the compression mechanism of the compressor 11.

The output unit 65 outputs the determination result of whether there is a refrigerant leak abnormality to the data storage 62 and the notification unit 52. When there is no refrigerant leak abnormality, the output unit 65 outputs the estimation result of a refrigerant leak abnormality occurrence time to the data storage 62 and the notification unit 52. The notification unit 52 indicates the determination result of whether there is a refrigerant leak abnormality and the estimation result of a refrigerant leak abnormality occurrence time using, for example, the display 53. The output unit 65 further includes a wireless communicator including an antenna. The output unit 65 is configured to communicate with a terminal of a manager (manager terminal 70) through the wireless communicator. The output unit 65 outputs the determination result of whether there is a refrigerant leak abnormality and the estimation result of a refrigerant leak abnormality occurrence time to the manager terminal 70.

The determination of whether there is a refrigerant leak abnormality and the estimation of a refrigerant leak abnormality occurrence time, which are performed by the abnormality determination unit 64, will now be described in detail.

The calculator 66 uses time series test data in the pre-trip inspection stored in each storage region of the storage unit 63c to calculate the first index value for each test operating mode in a moving average of time series test data in the first period and calculate the second index value for each test operating mode in a moving average of time series test data in the second period. The calculator 66 calculates the first index value and the second index value of each test operating mode using time series test data obtained in the first period and the second period that are before execution of the process. The calculator 66 calculates the deviation degree of the first index value from the second index value for each test operating mode. The first period and the second period are the same as the first period and the second period of the first embodiment.

Each of the first index value and the second index value is a discharge side refrigerant temperature ratio of the compressor 11. The discharge side refrigerant temperature ratio of the compressor 11 is expressed by a ratio of an actual value of the discharge side refrigerant temperature of the compressor 11 to an estimation value of the discharge side refrigerant temperature of the compressor 11. In the present embodiment, the ratio of the actual value of the discharge side refrigerant temperature of the compressor 11 to the estimation value of the discharge side refrigerant temperature of the compressor 11 is defined as the discharge side refrigerant temperature ratio of the compressor 11.

The calculator 66 calculates the discharge side refrigerant temperature ratio of the compressor 11. More specifically, the calculator 66 calculates the estimation value of the discharge side refrigerant temperature of the compressor 11 and the actual value of the discharge side refrigerant temperature of the compressor 11 and calculates the discharge side refrigerant temperature ratio of the compressor 11 as a ratio of the calculated actual value of the discharge side refrigerant temperature of the compressor 11 to the calculated estimation value of the discharge side refrigerant temperature of the compressor 11.

The calculator 66 calculates an estimation value of the discharge side refrigerant temperature of the compressor 11 using a regression analysis for each power source frequency and power source voltage of a power source, which is a source of power supplied to the refrigeration apparatus 1. In the regression analysis, a variable is, for example, at least one of the condensation temperature, the evaporation temperature, the opening degree of the first expansion valve 14A, the opening degree of the second expansion valve 14B, the rotational frequency of the compressor 11, or the rotational speed of the compressor 11, when the refrigerant contained amount of the refrigerant circuit 20 is in the appropriate range.

More specifically, in a transporting refrigeration apparatus such as a shipping container, the power source frequency and the power source voltage of a power source arranged at a terminal such as a harbor may differ from the power source frequency and the power source voltage of a power source arranged in a ship. In an example, the power source arranged at a terminal has a power source frequency of 50 Hz and a power source rated voltage of 380 V±10%. The power source arranged in a ship has a power source frequency of 60 Hz and a power source rated voltage of 440 V±10%. Examples of combinations of a power source frequency and a power source voltage include first to sixth combinations. In the first combination, the power source frequency is 50 Hz, and the power source voltage is 342 V (lower limit value of the power source voltage when the power source frequency is 50 Hz). In the second combination, the power source frequency is 50 Hz, and the power source voltage is 380 V (median of the power source voltage when the power source frequency is 50 Hz). In the third combination, the power source frequency is 50 Hz, and the power source voltage is 418 V (upper limit value of the power source voltage when the power source frequency is 50 Hz). In the fourth combination, the power source frequency is 60 Hz, and the power source voltage is 396 V (lower limit value of the power source voltage when the power source frequency is 60 Hz). In the fifth combination, the power source frequency is 60 Hz, and the power source voltage is 440 V (median of the power source voltage when the power source frequency is 60 Hz). In the sixth combination, the power source frequency is 60 Hz, and the power source voltage is 484 V (upper limit value of the power source voltage when the power source frequency is 60 Hz). The calculator 66 calculates an estimation value of the discharge side refrigerant temperature of the compressor 11 for each of the first to sixth combinations. The combinations of the power source frequency and the power source voltage may be changed in any manner.

The calculator 66 calculates an actual value of the discharge side refrigerant temperature of the compressor 11 from a signal from the discharge temperature sensor 41. The actual value of the discharge side refrigerant temperature of the compressor 11 increases relative to the estimation value of the discharge side refrigerant temperature of the compressor 11, for example, as the refrigerant leak amount of the refrigerant circuit 20 per unit time increases per unit time. The refrigerant leak amount per unit time is correlated with the deviation degree of the actual value of the discharge side refrigerant temperature of the compressor 11 from the estimation value of the discharge side refrigerant temperature of the compressor 11.

Figure 13A:
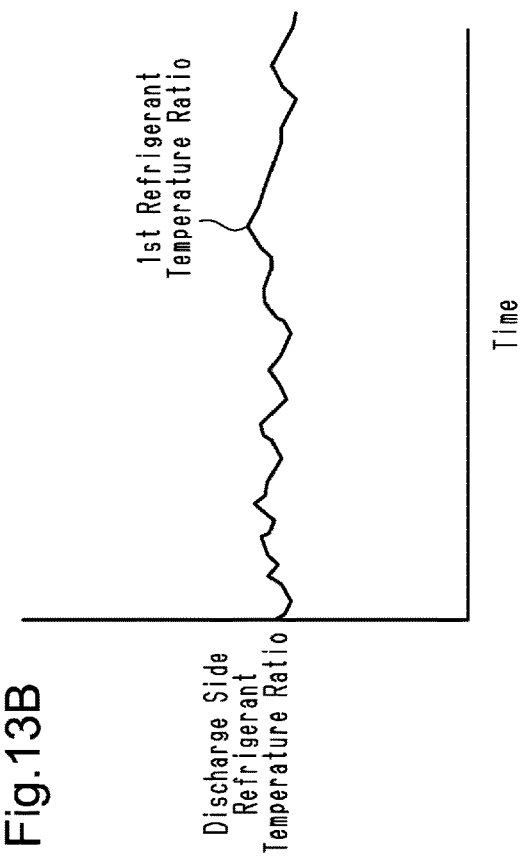
FIGS. 13A, 13B, 13C, and 13D are graphs showing examples of changes in a discharge side refrigerant temperature ratio of each pre-trip inspection in a second embodiment of a refrigeration apparatus.
Figure 13B:
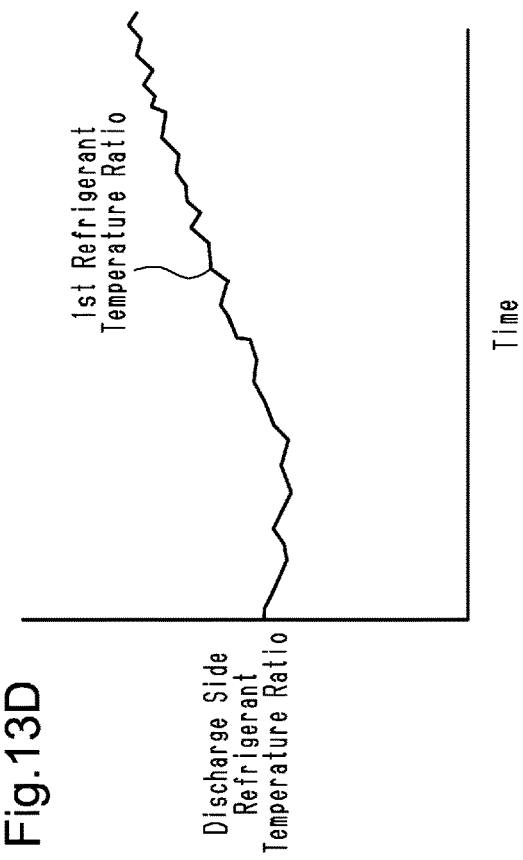
Figure 13C:
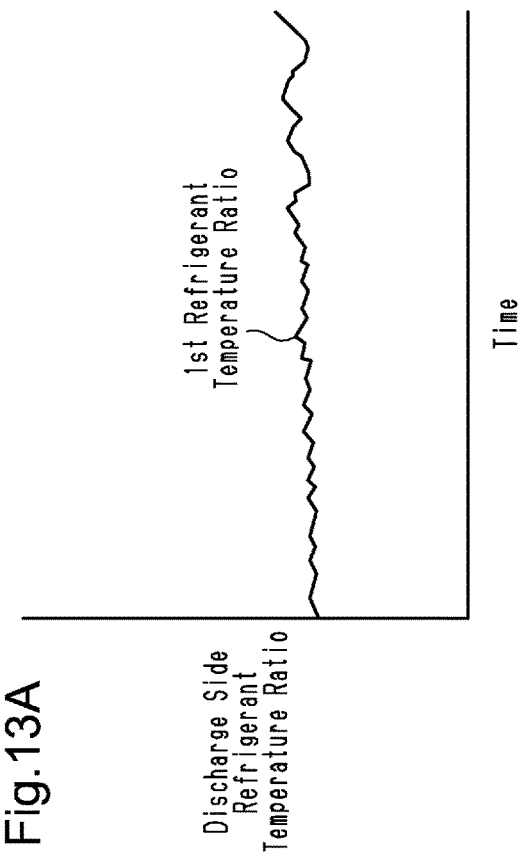
Figure 13D:
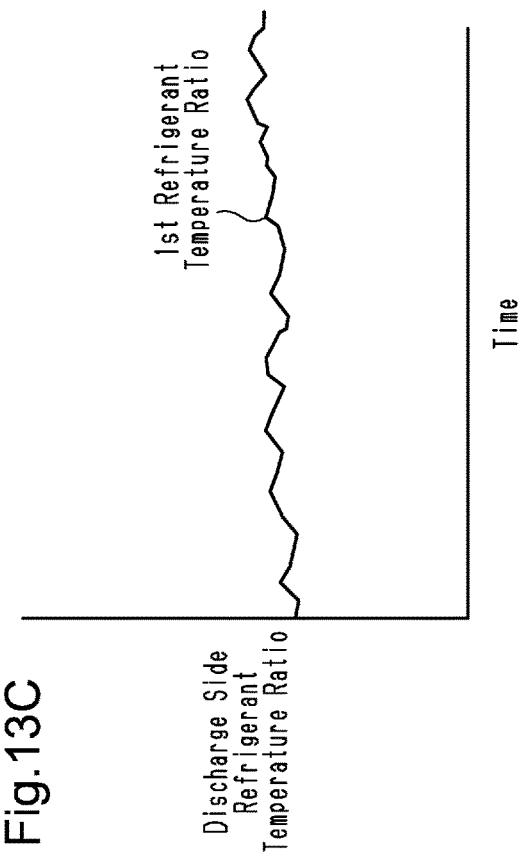

The calculator 66 calculates the discharge side refrigerant temperature ratio of the compressor 11 obtained in the first period (hereafter, referred to as "first refrigerant temperature ratio") as the first index value and calculates the discharge side refrigerant temperature ratio of the compressor 11 obtained in the second period (hereafter, referred to as "second refrigerant temperature ratio") as the second index value. FIG. 13A shows an example of changes in the first refrigerant temperature ratio calculated from results of the cooling operation (in range) of the first pre-trip inspection after the refrigeration apparatus 1 is installed on the container. FIG. 13B shows changes in the first refrigerant temperature ratio calculated from results of the cooling operation (in range) of the second pre-trip inspection. FIG. 13C shows changes in the first refrigerant temperature ratio calculated from results of the cooling operation (in range) of the third pre-trip inspection. FIG. 13D shows changes in the first refrigerant temperature ratio calculated from results of the cooling operation (in range) of the fourth pre-trip inspection. FIG. 14A is a graph that joins the test data of FIGS. 13A to 13D in time order. The graph shown in FIG. 14A shows changes in the first refrigerant temperature ratio and the second refrigerant temperature ratio in the cooling operation (in range). As shown in FIG. 14A, until the cooling operation (in range) of the third pre-trip inspection, the deviation degree of the first refrigerant temperature ratio from the second refrigerant temperature ratio is small. However, from the cooling operation (in range) of the fourth pre-trip inspection, the degree deviation gradually increases.

The calculator 66 calculates, for example, the deviation degree of the first refrigerant temperature ratio from the second refrigerant temperature ratio. In the present embodiment, the deviation degree of the first refrigerant temperature ratio from the second refrigerant temperature ratio is expressed by a ratio of the first refrigerant temperature ratio to the second refrigerant temperature ratio. As the ratio increases, the deviation degree of the first refrigerant temperature ratio from the second refrigerant temperature ratio increases. The deviation degree of the first refrigerant temperature ratio from the second refrigerant temperature ratio may be expressed by a difference between the first refrigerant temperature ratio and the second refrigerant temperature ratio. As the difference increases, the deviation degree of the first refrigerant temperature ratio from the second refrigerant temperature ratio increases. FIG. 14B is a graph showing an example of changes in the deviation degree of the first refrigerant temperature ratio from the second refrigerant temperature ratio in the cooling operation (in range). As shown in FIG. 14B, the deviation degree of the first refrigerant temperature ratio from the second refrigerant temperature ratio is substantially 1.00 in the cooling operation (in range) of the first to third pre-trip inspections. In the cooling operation (in range) of the fourth pre-trip inspection, the deviation degree of the first refrigerant temperature ratio from the second refrigerant temperature ratio gradually increases.

When the deviation degree of the first refrigerant temperature ratio from the second refrigerant temperature ratio is greater than or equal to a third threshold value X3, the determination unit 67 determines that there is a refrigerant leak abnormality. The third threshold value X3 is set in advance by experiments or the like and is used to determine occurrence of a refrigerant leak abnormality that may provoke an abnormality of the refrigeration apparatus 1.

The determination unit 67 estimates a refrigerant leak abnormality occurrence time based on a change trend of the deviation degree of the first refrigerant temperature ratio from the second refrigerant temperature ratio. More specifically, the calculator 66 calculates the deviation degree of the first refrigerant temperature ratio from the second refrigerant temperature ratio for each test operating mode, for example, in the most recent pre-trip inspection and outputs the calculated deviation degrees to the determination unit 67. The determination unit 67 obtains the change trend of the deviation degree from the deviation degree of the second refrigerant temperature ratio from the second refrigerant temperature ratio for each test operating mode, for example, in the most recent pre-trip inspection. The determination unit 67 estimates a time at which the deviation degree reaches the third threshold value X3 based on the change trend of the deviation degree of the first refrigerant temperature ratio from the second refrigerant temperature ratio in the most recent pre-trip inspection. The determination unit 67 may calculate a slope of the deviation degree using, for example, regression analysis or a straight line that connects deviation degrees of predetermined two periods. In an example, as shown in FIG. 14B, the determination unit 67 estimates the deviation degree of the cooling operation (in range) in the fifth or later pre-trip inspections (indicated by broken line in FIG. 14B) based on changes in the deviation degree of the first refrigerant temperature ratio from the second refrigerant temperature ratio in the cooling operation (in range) of the fourth pre-trip inspection. The determination unit 67 estimates a refrigerant leak abnormality occurrence time based on a comparison of the third threshold value X3 with changes in the deviation degree of the cooling operation (in range) in the fifth or later pre-trip inspections. In FIG. 14B, it is assumed that the deviation degree will reach the third threshold value X3 in the cooling operation (in range) of the fifth pre-trip inspection.

Procedures of determination of whether there is a refrigerant leak abnormality and estimation of a refrigerant leak abnormality occurrence time performed by the abnormality determination device 60 will be described in detail with reference to FIG. 15. This process is executed, for example, at least one of when there is a user request, when the transporting refrigeration apparatus 1 or the abnormality determination device 60 is powered on, when transportation of the refrigeration apparatus 1 is completed, or when the pre-trip inspection of the refrigeration apparatus 1 is conducted. In the present embodiment, at each of when there is a user request, when the refrigeration apparatus 1 or the abnormality determination device 60 is powered on, when transportation of the refrigeration apparatus 1 is completed, and when the pre-trip inspection of the refrigeration apparatus 1 is conducted, the abnormality determination device 60 determines whether there is a refrigerant leak abnormality. Then, when there is no refrigerant leak abnormality, the abnormality determination device 60 estimates a refrigerant leak abnormality occurrence time.

In step S31, the abnormality determination device 60 calculates the first refrigerant temperature ratio of the compressor 11 and the second refrigerant temperature ratio of the compressor 11 for each test operating mode of the pre-trip inspection from data related to operation of the refrigeration apparatus 1 and then proceeds to step S32. In step S32, the abnormality determination device 60 calculates the deviation degree of the first refrigerant temperature ratio from the second refrigerant temperature ratio for each test operating mode and then proceeds to step S33.

In step S33, the abnormality determination device 60 determines whether the deviation degree of the first refrigerant temperature ratio from the second refrigerant temperature ratio is greater than or equal to the third threshold value X3. When an affirmative determination is made in step S33, the abnormality determination device 60 proceeds to step S34 to determine that there is a refrigerant leak abnormality and then proceeds to step S35. In step S35, the abnormality determination device 60 transmits the determination result to at least one of the display 53 or the manager terminal 70 and then temporarily ends the process. The display 53 and the manager terminal 70 issue notification of the determination result of whether there is a refrigerant leak abnormality in step S35 at least one of when there is a user request, when the refrigeration apparatus 1 or the abnormality determination device 60 is powered on, when transportation of the refrigeration apparatus 1 is completed, or when the pre-trip inspection of the refrigeration apparatus 1 is conducted. In the present embodiment, the display 53 and the manager terminal 70 issue notification of the determination result of whether there is a refrigerant leak abnormality each of when there is a user request, when the refrigeration apparatus 1 or the abnormality determination device 60 is powered on, when transportation of the refrigeration apparatus 1 is completed, and when the pre-trip inspection of the refrigeration apparatus 1 is conducted.

When a negative determination is made in step S33, the abnormality determination device 60 proceeds to step S36 to calculate a change trend of the deviation degree of the first refrigerant temperature ratio from the second refrigerant temperature ratio and then proceeds to step S37.

In step S37, the abnormality determination device 60 estimates a refrigerant leak abnormality occurrence time based on a slope of the deviation degree of the first refrigerant temperature ratio from the second refrigerant temperature ratio and then proceeds to step S38. In step S38, the abnormality determination device 60 transmits the estimation result to at least one of the display 53 or the manager terminal 70 and then temporarily ends the process. The display 53 and the manager terminal 70 issue notification of the estimation result of a refrigerant leak abnormality occurrence time in step S38 at least one of when there is a user request, when the refrigeration apparatus 1 or the abnormality determination device 60 is powered on, when transportation of the refrigeration apparatus 1 is completed, or when the pre-trip inspection of the refrigeration apparatus 1 is conducted. In the present embodiment, the display 53 and the manager terminal 70 issue notification of the estimation result of the refrigerant leak abnormality occurrence time each of when there is a user request, when the refrigeration apparatus 1 or the abnormality determination device 60 is powered on, when transportation of the refrigeration apparatus 1 is completed, and when the pre-trip inspection of the refrigeration apparatus 1 is conducted.

In steps S35 and S38, the abnormality determination device 60 may communicate with the notification unit 52 instead of the display 53. When the notification unit 52 includes a speaker, the notification unit 52 may issue notification of the determination result of whether there is a refrigerant leak abnormality and notification of the estimation result of a refrigerant leak abnormality occurrence time with the speaker.

The method for determining a refrigerant leak abnormality executed by the abnormality determination device 60 described above includes a data storing step, an extracting step, a first calculating step, a second calculating step, and a determining step. The steps will be described below.

The data storing step is a step of storing data related to operation of the refrigeration apparatus 1. In an example, in the data storing step, data related to operation of the refrigeration apparatus 1 and obtained from the data obtainment unit 61 is stored in the data storage 62 as time series data.

The extracting step is a step of extracting time series test data related to a same one of the test operating modes from time series data when the pre-trip inspection is conducted multiple times after installation of the refrigeration apparatus 1 to the container. In an example, the extracting step, for all of the test operating modes of all of the pre-trip inspections conducted from when the refrigeration apparatus 1 is installed to the present time, time series test data of each test operating mode is extracted. In an example, the extracting step further includes a pre-processing step that removes test data that acts as noise when determining whether there is a refrigerant leak abnormality and estimating a refrigerant leak abnormality occurrence time with the pre-processing unit 63 and replaces it with alternative data.

The first calculating step is a step of calculating the first index value of each test operating mode from time series test data obtained in the first period and calculating the second index value of each test operating mode from time series test data obtained in the second period. In an example, the first calculating step is executed by the calculator 66 to calculate the first index value for each test operating mode using a moving average of the time series test data obtained in the first period and calculate the second index value for each test operating mode using a moving average of the time series test data obtained in the second period. The relationship of the first calculating step with FIG. 15 is that step S31 in FIG. 15 corresponds to the first calculating step.

The second calculating step is a step of calculating the deviation degree of the refrigerant circuit 20 from the normal state for each test operating mode from the first index value and the second index value. In an example, the second calculating step is executed by the calculator 66. The relationship of the second calculating step with FIG. 15 is that step S32 in FIG. 15 corresponds to the second calculating step.

The determining step is a step of determining whether there is a refrigerant leak abnormality for each test operating mode based on the deviation degree of the refrigerant circuit 20 from the normal state, and when there is no refrigerant leak abnormality, estimating a refrigerant leak abnormality occurrence time. In an example, in the determining step, when the second index value refers to the normal state of the refrigerant circuit 20 and the deviation degree of the first index value from the second index value becomes greater than or equal to a threshold value, it is determined that there is a refrigerant leak abnormality. In the determining step, a time at which the deviation degree reaches the threshold value is estimated based on a change trend of the deviation degree of the first index value from the second index value, so that a refrigerant leak abnormality occurrence time is estimated. The relationship of the determining step with FIG. 15 is that steps S33 to S38 in FIG. 15 correspond to the determining step.

The advantages of the present embodiment will now be described. The present embodiment obtains the following advantages in addition to the advantages (1-1) to (1-10) of the first embodiment.

(2-1) When the amount of refrigerant enclosed in the refrigerant circuit 20 (refrigerant contained amount) is less than the appropriate range, suction pressure of the compressor 11 decreases and the cooling the inside of the compressor 11 with the refrigerant may become insufficient. As a result, the temperature of the compressor 11 may be excessively increased. More specifically, when the amount of refrigerant enclosed in the refrigerant circuit 20 is less than the lower limit value of the appropriate range, the discharge side refrigerant temperature of the compressor 11 is higher than when the amount of refrigerant enclosed in the refrigerant circuit 20 is in the appropriate range. In the present embodiment, the discharge side refrigerant temperature ratio, which is a ratio of the actual value of the discharge side refrigerant temperature of the compressor 11 to the estimation value of the discharge side refrigerant temperature of the compressor 11, is used as each of the first index value and the second index value. This allows the determination unit 67 to accurately determine whether there is a refrigerant leak abnormality and to accurately estimate a refrigerant leak abnormality occurrence time when there is no refrigerant leak abnormality.

(2-2) The calculator 66 calculates an estimation refrigerant temperature for each power source frequency and power source voltage and calculates the first refrigerant temperature ratio and the second refrigerant temperature ratio for each power source frequency and power source voltage. With this configuration, the first refrigerant temperature ratio and the second refrigerant temperature ratio are calculated with higher accuracy. This allows the determination unit 67 to accurately determine whether there is a refrigerant leak abnormality and to accurately estimate a refrigerant leak abnormality occurrence time when there is no refrigerant leak abnormality.

Modified Examples

The description related to the above embodiments exemplifies, without any intention to limit, applicable forms of an abnormality determination device for a transporting refrigeration apparatus, a refrigeration apparatus including the abnormality determination device, and a method for determining an abnormality of a transporting refrigeration apparatus according to the present disclosure. The abnormality determination device for a transporting refrigeration apparatus, the refrigeration apparatus including the abnormality determination device, and the method for determining an abnormality of a transporting refrigeration apparatus according to the present disclosure can be applicable to, for example, modified examples of the embodiments that are described below and combinations of at least two of the modified examples that do not contradict each other. In the following modified examples, the same reference numerals are given to those elements that are the same as the corresponding elements of the above embodiments. Such elements will not be described in detail.

In the first embodiment, the pre-processing unit 63 removes, from time series data, data that acts as noise when determining whether the compressor 11 has an abnormality and estimating an abnormality occurrence time of the compressor 11, and replaces the section of the removed data with alternative data. However, there is no limit to such a configuration. The pre-processing unit 63 may only remove, from time series data, data that acts as noise when determining whether the compressor 11 has an abnormality and estimating an abnormality occurrence time of the compressor 11. This configuration accurately determines whether the compressor 11 has an abnormality and estimates an abnormality occurrence time of the compressor 11.

In the first embodiment, the abnormality determination device 60 uses one of the polytropic index and the compressor current ratio to determine whether the compressor 11 has an abnormality, and when there is no abnormality, estimates an abnormality occurrence time of the compressor 11. However, there is no limit to such a configuration. For example, the abnormality determination device 60 may use both the polytropic index and the compressor current ratio to determine whether the compressor 11 has an abnormality, and when there is no abnormality, estimate an abnormality occurrence time of the compressor 11.

In the first embodiment, the first index value and the second index value may be calculated from the estimation value of current supplied to the compressor 11 or the actual value of current supplied to the compressor 11 instead of the compressor current ratio. In an example, the calculator 66 calculates the first index value using a moving average of estimation values of current supplied to the compressor 11 in the first period and calculates the second index value using a moving average of estimation values of current supplied to the compressor 11 in the second period. In an example, the calculator 66 calculates the first index value using a moving average of actual values of current supplied to the compressor 11 in the first period and calculates the second index value using a moving average of actual values of current supplied to the compressor 11 in the second period.

In the second embodiment, the pre-processing unit 63 removes, from time series test data, operation data that acts as noise when determining whether there is a refrigerant leak abnormality and estimating a refrigerant leak abnormality occurrence time when there is no refrigerant leak abnormality, and replaces the section of the removed operation data with alternative data. However, there is no limit to such a configuration. The pre-processing unit 63 may only remove, from time series test data, operation data that acts as noise when determining whether there is a refrigerant leak abnormality and estimating a refrigerant leak abnormality occurrence time when there is no refrigerant leak abnormality. This configuration accurately determines whether there is a refrigerant leak abnormality and estimates a refrigerant leak abnormality occurrence time.

In the second embodiment, the first index value and the second index value may be calculated from the estimation value of the discharge side refrigerant temperature of the compressor 11 or the actual value of the discharge side refrigerant temperature of the compressor 11 instead of the discharge side refrigerant temperature ratio. In an example, the calculator 66 calculates the first index value using a moving average of estimation values of the discharge side refrigerant temperature of the compressor 11 in the first period and calculates the second index value using a moving average of estimation values of the discharge side refrigerant temperature of the compressor 11 in the second period. In an example, the calculator 66 calculates the first index value using a moving average of actual values of the discharge side refrigerant temperature of the compressor 11 in the first period and calculates the second index value using a moving average of actual values of the discharge side refrigerant temperature of the compressor 11 in the second period.

In the second embodiment, the first index value and the second index value may be a discharge pressure ratio, which is a ratio of an actual value of discharge pressure of the compressor 11 to an estimation value of discharge pressure of the compressor 11, instead of the discharge side refrigerant temperature ratio. The calculator 66 calculates a discharge pressure ratio in the first period (hereafter, referred to as "first pressure ratio") as the first index value and a discharge pressure ratio in the second period (hereafter, referred to as "second pressure ratio") as the second index value. The calculator 66 calculates a deviation degree of the first pressure ratio from the second pressure ratio. When the deviation degree of the first pressure ratio from the second pressure ratio is greater than or equal to a predetermined threshold value, the determination unit 67 determines that there is a refrigerant leak abnormality. The determination unit 67 also estimates a refrigerant leak abnormality occurrence time based on a change trend of the deviation degree of the first pressure ratio from the second pressure ratio. The discharge side refrigerant temperature ratio may be replaced with a ratio of an actual value of a degree of superheating the intake gas refrigerant drawn into the compressor 11 to an estimation value of the degree of superheating the intake gas refrigerant or a ratio of an actual value of a degree of subcooling the liquid refrigerant at an outlet of the condenser 12 to an estimation value of the degree of subcooling the liquid refrigerant at the outlet of the condenser 12.

In the modified example described above, the first index value and the second index value may be calculated from an estimation value of the discharge pressure of the compressor 11 or an actual value of the discharge pressure of the compressor 11 instead of the discharge pressure ratio. In an example, the calculator 66 calculates the first index value using a moving average of estimation values of the discharge pressure of the compressor 11 in the first period and calculates the second index value using a moving average of estimation values of the discharge pressure of the compressor 11 in the second period. In an example, the calculator 66 calculates the first index value using a moving average of actual values of the discharge pressure of the compressor 11 in the first period and calculates the second index value using a moving average of actual values of the discharge pressure of the compressor 11 in the second period.

In the embodiments, the abnormality determination device 60 may determine whether the refrigeration apparatus 1 has an abnormality based on a change trend of time series test data of a predetermined one of the test operating modes, and when there is no abnormality, estimate an abnormality occurrence time. More specifically, the pre-processing unit 63 extracts time series test data of the predetermined one of the test operating modes when the pre-trip inspection is conducted multiple times. The calculator 66 uses the time series test data of the predetermined test operating mode to calculate a first index value and a second index value and calculates a deviation degree of the first index value from the second index value. The determination unit 67 determines whether the refrigeration apparatus 1 has an abnormality based on the deviation degree of the first index value from the second index value of the predetermined test operating mode, and when there is no abnormality, estimates an abnormality occurrence time. The predetermined one of the test operating modes may be one test operating mode or multiple test operating modes. Thus, the determination unit 67 determines whether the refrigeration apparatus 1 has an abnormality from a change trend in the time series test data related to at least one of the same one of the operating modes when the pre-trip inspection is conducted multiple times. Then, when there is no abnormality, the determination unit 67 estimates the abnormality occurrence time. This configuration uses test data of a specified test operating mode obtained in the pre-trip inspection, in which variations in the operation state of the refrigeration apparatus 1 are limited, to determine whether the refrigeration apparatus 1 has an abnormality, and when there is no abnormality, estimates an abnormality occurrence time. The determination and the estimation are performed with high accuracy.

In the embodiments, the abnormality determination device 60 does not have to use all of the test data when the pre-trip inspection is conducted multiple times. When the pre-trip inspection is conducted N times, the abnormality determination device 60 may use test data obtained in the pre-trip inspection that is conducted once to (N−1) times to determine whether the refrigeration apparatus 1 has an abnormality. Then, when there is no abnormality, the abnormality determination device 60 may estimate an abnormality occurrence time. The abnormality determination device 60 may use test data of the pre-trip inspection that is not consecutively conducted multiple times, instead of test data of the pre-trip inspection that is consecutively conducted multiple times, to determine whether the refrigeration apparatus 1 has an abnormality and estimate an abnormality occurrence time when there is no abnormality. In an example, the abnormality determination device 60 uses test data obtained in the M-th pre-trip inspection, the (M+2)th pre-trip inspection, the (M+4)th pre-trip inspection, and the (M+6)th pre-trip inspection to determine whether the refrigeration apparatus 1 has an abnormality and estimate an abnormality occurrence time when there is no abnormality.

In the embodiments, test data of the pre-trip inspection that is conducted before the refrigeration apparatus 1 is installed on a container may be added to test data of the pre-trip inspection that is conducted after the refrigeration apparatus 1 is installed on the container, and whether the refrigeration apparatus 1 has an abnormality may be determined. Then, when there is an abnormality, an abnormality occurrence time may be estimated. More specifically, inspection data is obtained in a bench test performed on the refrigeration apparatus 1 under the same condition as the test operating modes used in the pre-trip inspection, and the pre-processing unit 63 adds the inspection data to the time series test data used to determine whether the refrigeration apparatus 1 has an abnormality and estimate an abnormality occurrence time. The determination unit 67 determines whether the refrigeration apparatus 1 has an abnormality based on the test data to which the inspection data is added and, when there is no abnormality, estimates an abnormality occurrence time. In this configuration, a data amount of the test data is increased. Therefore, whether the refrigeration apparatus 1 has an abnormality is determined with high accuracy. When there is no abnormality, the abnormality occurrence time is estimated with high accuracy.

In the embodiments, after the refrigeration apparatus 1 is installed on a container and the container is loaded on the transporting device, the refrigeration apparatus 1 may be operated at the same set temperature as the test operating mode of the pre-trip inspection. In this case, operation data of operating at the same set temperature as the test operating mode of the pre-trip inspection may be added, and whether the refrigeration apparatus 1 has an abnormality may be determined. When there is no abnormality, an abnormality occurrence time may be estimated. More specifically, the pre-processing unit 63 adds the operation data of operating at the same set temperature as the test operating mode of the pre-trip inspection to time series test data used to determine whether the refrigeration apparatus 1 has an abnormality and estimate an abnormality occurrence time. The determination unit 67 determines whether the refrigeration apparatus 1 has an abnormality based on the test data to which the operation data is added and, when there is no abnormality, estimates an abnormality occurrence time. In this configuration, a data amount of the test data is increased. Therefore, whether the refrigeration apparatus 1 has an abnormality is determined with high accuracy. When there is no abnormality, the abnormality occurrence time is estimated with high accuracy.

In the embodiments, the determination unit 67 may determine whether the refrigeration apparatus 1 has an abnormality and estimate an abnormality occurrence time through machine learning. Preferably, the determination unit 67 determines whether the refrigeration apparatus 1 has an abnormality and estimates an abnormality occurrence time for each test operating mode through machine learning. This increases the accuracy of determining whether the refrigeration apparatus 1 has an abnormality and estimating an abnormality occurrence time.

In the embodiments, the deviation degree of the first index value from the second index value is expressed by the ratio of the first index value to the second index value. The process of calculating the deviation degree between the first index value and the second index value may be changed in any manner. The calculator 66 may calculate the deviation degree between the first index value and the second index value, for example, based on at least one of a standard deviation, skewness, likelihood, kurtosis, or an average using the first index value and the second index value.

In the embodiments, the data storage 62 may be an external server of the refrigeration apparatus 1 connected to the refrigeration apparatus 1 to communicate with the refrigeration apparatus 1. An example of the server is a cloud server. More specifically, the abnormality determination device 60 transmits data obtained in the data obtainment unit 61 to the server so that the server stores the data.

In the embodiments, the abnormality determination device 60 and the notification unit 52 are separately arranged. However, the abnormality determination device 60 may include the notification unit 52.

Figure 16:
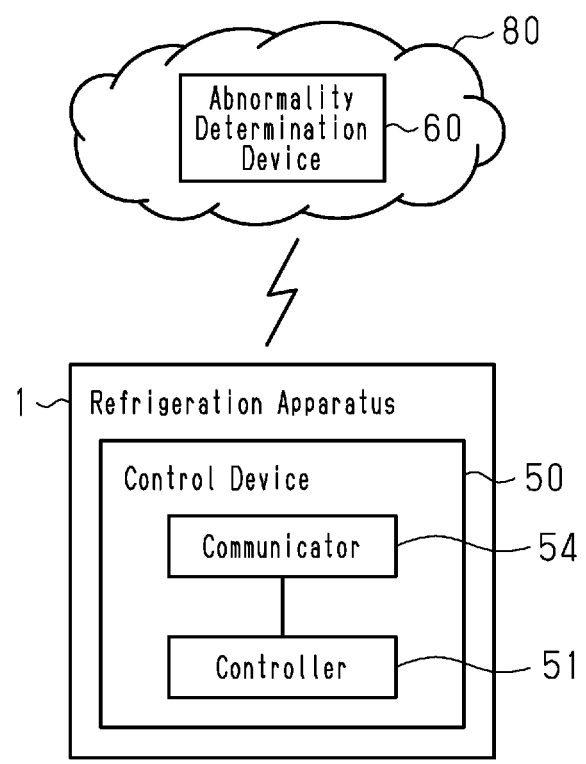
FIG. 16 is a block diagram showing electrical configurations of a modified example of a refrigeration apparatus.

In the embodiments, the refrigeration apparatus 1 includes the abnormality determination device 60. However, the refrigeration apparatus 1 is not limited to this configuration. For example, the abnormality determination device 60 may be omitted from the refrigeration apparatus 1. The abnormality determination device 60 and the refrigeration apparatus 1 may be separately arranged. In an example, as shown in FIG. 16, the abnormality determination device 60 may be arranged on a server 80 that is configured to communicate with the refrigeration apparatus 1. An example of the server 80 is a cloud server. In this case, the refrigeration apparatus 1 includes a communicator 54 connected to the abnormality determination device 60 to communicate with the abnormality determination device 60. The communicator 54 is electrically connected to the controller 51. The refrigeration apparatus 1 obtains a determination result of whether the refrigeration apparatus 1 has an abnormality or an estimation result of an abnormality occurrence time of the refrigeration apparatus 1 from the abnormality determination device 60 through the communicator 54.

While the embodiments of the device have been described herein above, it is to be appreciated that various changes in form and detail may be made without departing from the spirit and scope of the device presently or hereafter claimed.

The invention claimed is:

1. An abnormality determination device for a transporting refrigeration apparatus, the abnormality determination device comprising:
 a determination unit that determines an abnormality of the transporting refrigeration apparatus installed on a container, wherein
 the transporting refrigeration apparatus includes a refrigerant circuit that connects a compressor, a condenser, a decompression device, and an evaporator,
 in pre-trip inspection that is conducted before the container is loaded on a transporting device, a test operation is performed for at least one of a plurality of test operating modes,
 the pre-trip inspection is conducted multiple times such that the at least one of the plurality of test operating modes is performed multiple times,
 the abnormality determination device is configured to obtain at least part of time series test data related to the at least one of the plurality of test operating modes performed in the pre-trip inspection,
 the determination unit is configured to determine whether the transporting refrigeration apparatus has an abnormality based on a change trend of the time series test data related to the at least one test operating mode performed multiple times after the pre-trip inspection has been conducted multiple times,
 the determination unit is configured to determine whether the transporting refrigeration apparatus has an abnormality based on the time series test data obtained in a predetermined first period and the time series test data obtained in a second period that differs from the first period,
 the abnormality determination device for the transporting refrigeration apparatus further comprising:
 a calculator that calculates a deviation degree of the transporting refrigeration apparatus from a normal state based on the time series test data obtained in the pre-trip inspection, wherein
  the calculator is configured to calculate a first index value from the time series test data that are obtained in the first period and a second index value from the time series test data that are obtained in the second period,
  the calculator is configured to calculate a deviation state of the transporting refrigeration apparatus from the normal state based on the first index value and the second index value,
  the determination unit is configured to determine whether the transporting refrigeration apparatus has an abnormality based on the deviation degree of the transporting refrigeration apparatus from the normal state, and
 when there is no abnormality, the determination unit is configured to estimate an abnormality occurrence time.

2. The abnormality determination device for the transporting refrigeration apparatus according to claim 1, wherein the determination unit is configured to determine whether the transporting refrigeration apparatus has an abnormality based on a change trend of the time series test data related to multiple of test operating modes each performed multiple times after the pre-trip inspection has been conducted multiple times, and
 when there is no abnormality, the determination unit is configured to estimate an abnormality occurrence time.

3. The abnormality determination device for the transporting refrigeration apparatus according to claim 1, wherein the determination unit determines whether the transporting refrigeration apparatus has an abnormality and estimates an abnormality occurrence time through machine learning.

4. The abnormality determination device for the transporting refrigeration apparatus according to claim 1, further comprising:
a storage unit that stores the time series test data of each of the test operating modes in the pre-trip inspection.

5. The abnormality determination device for the transporting refrigeration apparatus according to claim 1, wherein
the determination unit is configured to determine whether the transporting refrigeration apparatus has an abnormality based on a temporal change of the time series test data related to the at least one of the plurality of test operating modes performed multiple times after the pre-trip inspection has been consecutively conducted multiple times, and
when there is no abnormality, the determination unit is configured to estimate an abnormality occurrence time.

6. The abnormality determination device for the transporting refrigeration apparatus according to claim 1, wherein
the determination unit is configured to add inspection data, which is obtained in a bench test of the transporting refrigeration apparatus performed under a same condition as the test operating modes in the pre-trip inspection, to the time series test data that are used to determine whether the transporting refrigeration apparatus has an abnormality and to estimate an abnormality occurrence time,
the determination unit is configured to determine whether the transporting refrigeration apparatus has an abnormality based on the test data including the inspection data, and
when there is no abnormality, the determination unit is configured to estimate an abnormality occurrence time.

7. The abnormality determination device for the transporting refrigeration apparatus according to claim 1, wherein
after the transporting refrigeration apparatus is installed, when the transporting refrigeration apparatus is operated at a same set temperature as the test operating modes used in the pre-trip inspection, the determination unit is configured to add operation data obtained when operated at the same set temperature as the test operating modes used in the pre-trip inspection to the time series test data that are used to determine whether the transporting refrigeration apparatus has an abnormality and to estimate an abnormality occurrence time,
the determination unit is configured to determine whether the transporting refrigeration apparatus has an abnormality based on the test data including the operation data, and
when there is no abnormality, the determination unit is configured to estimate an abnormality occurrence time.

8. The abnormality determination device for the transporting refrigeration apparatus according to claim 1, further comprising:
a notification unit that issues notification of a determination result of whether the transporting refrigeration apparatus has an abnormality and notification of an estimation result of abnormality occurrence time, and
the notification unit is configured to issue the notification of the determination result and the notification of the estimation result at least one of when there is a user request, when the transporting refrigeration apparatus or the abnormality determination device is powered on, when transportation of the transporting refrigeration apparatus is completed, or when the pre-trip inspection of the transporting refrigeration apparatus is conducted.

9. The abnormality determination device for the transporting refrigeration apparatus according to claim 1, wherein the abnormality determination device is arranged on a server configured to communicate with the transporting refrigeration apparatus.

10. A transporting refrigeration apparatus, comprising:
the abnormality determination device according to claim 1.

11. An abnormality determination method for determining an abnormality of a transporting refrigeration apparatus installed on a container, the transporting refrigeration apparatus including a refrigerant circuit that connects a compressor, a condenser, a decompression device, and an evaporator, the abnormality determination method comprising:
storing data related to operation of the transporting refrigeration apparatus in time order;
extracting, from the data related to operation of the transporting refrigeration apparatus, time series test data related to at least one test operating mode used in pre-trip inspection that is conducted multiple times such that the at least one test operating mode is performed multiple times before the container is loaded on a transporting device; and
determining whether the transporting refrigeration apparatus has an abnormality based on a change trend of the extracted time series test data,
determining whether the transporting refrigeration apparatus has an abnormality based on the time series test data obtained in a predetermined first period and the time series test data obtained in a second period that differs from the first period,
the abnormality determination method for determining the abnormality of the transporting refrigeration apparatus further comprising:
calculating a deviation degree of the transporting refrigeration apparatus from a normal state based on the time series test data obtained in the pre-trip inspection, wherein
calculating a first index value from the time series test data that are obtained in the first period and a second index value from the time series test data that are obtained in the second period,
calculating a deviation state of the transporting refrigeration apparatus from the normal state based on the first index value and the second index value,
determining whether the transporting refrigeration apparatus has an abnormality based on the deviation degree of the transporting refrigeration apparatus from the normal state, and
when there is no abnormality, estimating an abnormality occurrence time.

* * * * *